United States Patent
Wu et al.

(10) Patent No.: US 12,443,687 B1
(45) Date of Patent: Oct. 14, 2025

(54) USER IDENTIFICATION ATTRIBUTION FOR TOUCH INTERACTIONS

(71) Applicant: Amazon Technologies, Inc., Seattle, WA (US)

(72) Inventors: Zhengyang Wu, Kenmore, WA (US); Raghuvir Mukeshkumar Songhela, Seattle, WA (US); Bharath Bhimanaik Kumar, Sammamish, WA (US); John Charles Howard, Redmond, WA (US); Shilong Yao, Bellevue, WA (US); Alok Upadhyay, Bellevue, WA (US); Roy Lee Scott, Seattle, WA (US); FNU Palak, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 18/082,783

(22) Filed: Dec. 16, 2022

(51) Int. Cl.
| | | |
|---|---|---|
| G06F 21/00 | (2013.01) | |
| G06F 21/32 | (2013.01) | |
| G06F 21/83 | (2013.01) | |
| G06V 40/16 | (2022.01) | |
| G10L 17/00 | (2013.01) | |

(52) U.S. Cl.
CPC .............. G06F 21/32 (2013.01); G06F 21/83 (2013.01); G06V 40/172 (2022.01); G10L 17/00 (2013.01)

(58) Field of Classification Search
CPC ....... G06F 21/32; G06F 21/83; G06V 40/172; G10L 17/00
See application file for complete search history.

(56) References Cited

U.S. PATENT DOCUMENTS

| | | | |
|---|---|---|---|
| 2019/0187787 A1* | 6/2019 | White | G06F 3/013 |
| 2020/0168229 A1* | 5/2020 | Manchireddy | H04W 4/80 |
| 2021/0258641 A1* | 8/2021 | Konzelmann | H04N 21/4126 |
| 2023/0116125 A1* | 4/2023 | Elcock | G10L 17/04 |
| | | | 704/246 |

* cited by examiner

Primary Examiner — William A Corum, Jr.
(74) Attorney, Agent, or Firm — Pierce Atwood LLP

(57) ABSTRACT

Techniques for determining user identification and attributing the user identification to a touch input received at a touch screen enabled electronic device are described. Some embodiments may include a touch screen enabled electronic device performing facial recognition to determine the identification of a user providing a touch input to the touch screen enabled electronic device. In some embodiments, the user identification is determined from a group of users associated with the electronic device. The touch input may correspond to an action or request, such as selecting an icon on the touch screen. In some embodiments, output data may be generated for display on the touch screen in response to the selected action or request. The user identification determined from the facial recognition may be used to personalize or customize, such as based on user preferences, the output data for display on the touch screen.

20 Claims, 17 Drawing Sheets

USER IDENTIFICATION ATTRIBUTION FOR TOUCH INTERACTIONS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
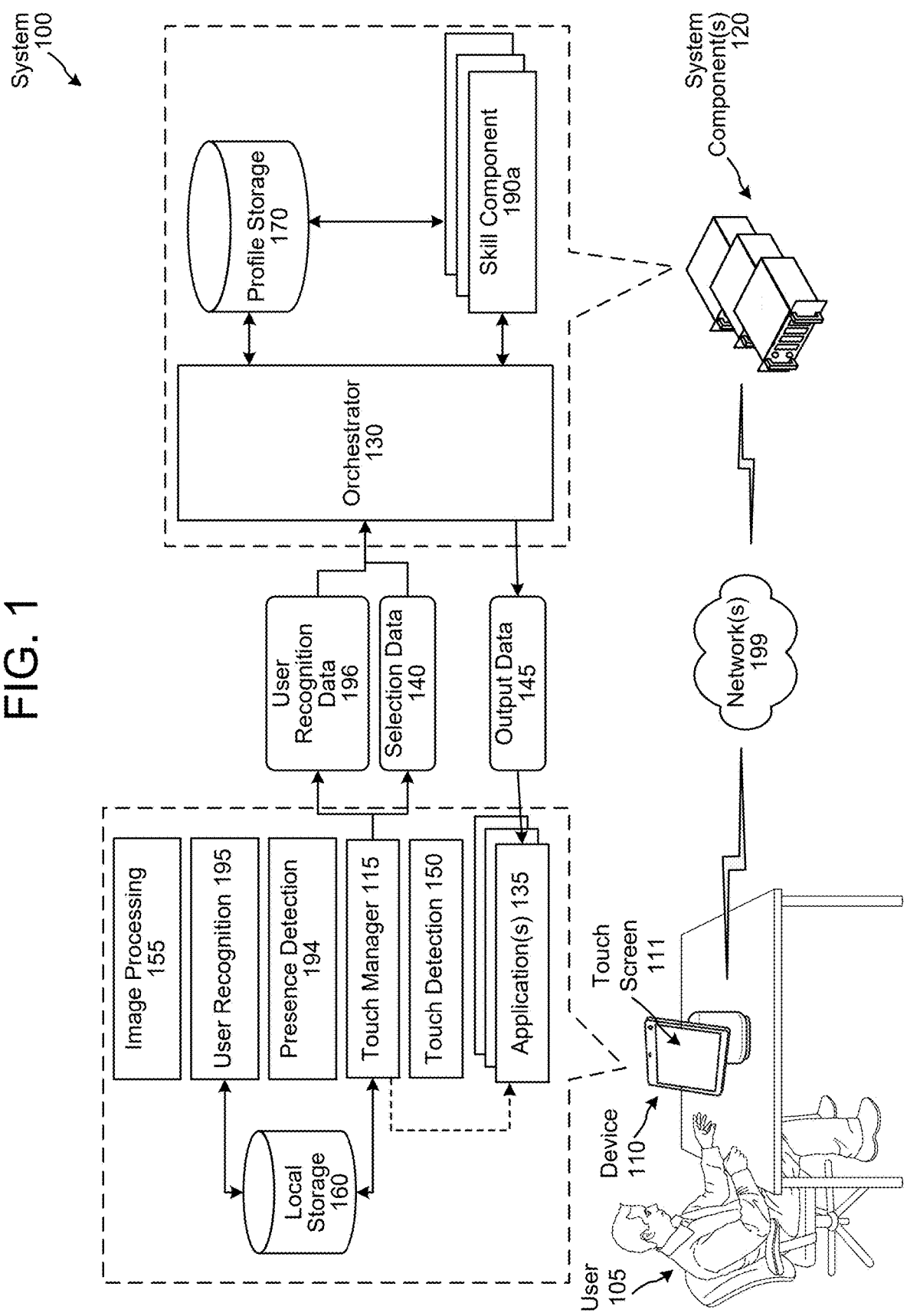
FIG. 1 is a conceptual diagram that illustrates attributing a user profile to a non-voice touch screen interaction with a virtual assistant system, according to embodiments of the present disclosure.

In touch screen enabled electronic devices, the touch screen often displays a graphical user interface which includes icons or other graphical elements with which a user may interact. Many icons are touchable by a user to select and operate the device such as engaging with an application, playing a game, launching a new application, and altering a display. These touchable elements of a user interface (UI) may be referred to as UI elements. A UI element may be a graphical element, textual element, or other element. Each UI element may be associated with a touch target, which is a defined area on the touchable screen that, when touched by a user, activates a particular action associated with the respective UI element. A touch target corresponds generally (but may not correspond exactly due to shape and other constraints) to the graphical area of its associated UI element. If a user touches the screen within the touch target, an action associated with the UI element is then triggered by the underlying computing processes of the device.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A touch screen enabled electronic device may include and/or interface with the speech-processing/virtual assistant system and may be configured to perform actions or provide information responsive to user inputs, including both voice commands and touch screen inputs. Such devices may be home assistant devices (such as an Amazon Echo Show) that are placed around a home to play music, control smart home features, and provide information, such as the weather forecast, etc. The device and/or virtual assistant system may personalize the interactions depending on the user. For example, if the user is named "John" and asks using a voice command for the weather forecast, the virtual assistant system may provide an audio response of "Today it will be partly cloudy out, John." The user may also add other customizations for a particular user such as responding in a particular voice, providing specific data as specified in the user's profile, or the like.

For single-user devices, such as phones, tablets, smart watches, or the like, a device may be associated with a default user whose preferences are used when the device is operated, thus allowing such a single-user device to assume the operator is the individual whose profile is associated with the device. In some embodiments, home assistant devices, such as the Amazon Echo Show, may have a group profile that includes multiple members, such as the people in the household. In certain instances, a user operating a device may be able to select that his or her profile should be active for the device. For example, when playing a movie from a video service such as Amazon Prime Video, when activating the service the user may select her profile from a login screen so that she may view the movies that are available to/preferred by her.

For spoken interactions, a user may not affirmatively select her profile before interacting with a device. For example, a user may not indicate that her profile should be active for a group device before saying "Alexa, play my morning playlist." In such a situation, however, the virtual assistant system may perform voice recognition to determine an identity of the user and associated user identifier, such as described below in reference to FIG. 10 and the audio component 1010. Depending on system configuration and user preferences, such identification may happen on a local device or by remote system components operating in a cloud-computing type environment. However, for a touch screen enabled electronic device the user may not interact with the device using a voice command or profile selection and instead may simply use the touch screen to provide input and commands without a prior indication of who is using the device. Different methods of user recognition may be used to identify the user such that the virtual assistant system may provide the user with an improved user experience by customizing the information or options displayed on the touch screen. For example, the user may select a touch screen option to play music and the virtual assistant system may generate a customized set of music suggestions based on identifying the user from user recognition, instead of the virtual assistant system generating a generic set of music suggestions without identifying the user.

To address these concerns, the present disclosure offers a method and system to perform user recognition, such as face recognition, to determine a user profile that is attributed to a received touch interaction. Information about the touch interaction with the device may be associated with user recognition information (generated by the device) which together may be sent to another device (e.g., a remote/cloud computing system of the virtual assistant) so the virtual assistant system may process the touch interaction in a way customized to the particular user who actually touched the screen of the multi-user device. The touching user's user profile (or user ID or other identifying information) may be used to personalize the response generated based on the action or command associated with the touch interaction. The system and methods disclosed herein are directed to a user device attributing a user profile (or user ID or other identifying information) to a non-voice user interaction, such as a touch-based user interaction when made with a device otherwise associated with multiple user profiles. For example, a user may use the touch screen enabled device of a home or office to add items to a shopping list. Data indicating that touch screen input may be sent to the virtual assistant system along with an indication of the user who touched the screen. If the virtual assistant system knows the identity of the user providing touch inputs (by virtue of the user identification performed by the device), then the name of the user may be attached to the items on the list and/or the user's preferred brand/size/quantity, etc. of the item may be incorporated into the shopping list entry. By attributing a user profile to touch interactions, a user's name may be added to notes and reminders created using touch interactions. Other customized operations may also be performed.

FIG. 1 is a conceptual diagram that illustrates attributing a user profile to a non-voice interaction with a virtual assistant system 100, according to embodiments of the present disclosure. The device 110 may be configured to recognize a user 105, and associate the user 105 with a touch-based input. As shown, the system 100 may include a user device 110 in communication with system component(s) 120 via a network(s) 199. The network(s) 199 may include the Internet and/or any other wide- or local-area network, and may include wired, wireless, and/or cellular network hardware. As illustrated in FIG. 1, the system component(s) 120 may include an orchestrator component 130 and skill component(s) 120, as well as additional components discussed below. As further illustrated in FIG. 1, the device 110 may include an image processing component 155, a user recognition component 195, a presence detection component 194, a touch manager component 115, a touch detection component 150, local storage 160, and one or more applications 135. Such applications may be software applications that operate on the device 110 and may have some functionality overlap with software applications that are operated by the system component(s) (e.g., skills discussed below) and/or may have different functionality. Although the figures illustrate the components in a particular arrangement, one skilled in the art will appreciate that different combinations and/or arrangements of the components are possible depending on the system's configuration and/or device's configuration without departing from the present disclosure. Moreover, it is noted that one or more of the components of the system component(s) 120 noted above may be implemented by the user device 110 and one or more of the components of the user device 110 noted above may be implemented by the system component(s) 120.

The device 110 may be configured with a touch screen interface 111. The touch screen interface 111 may be touch sensitive and configured to display images, video, and/or graphical user interface (GUI) elements. The device 110 may be configured with a camera. The camera of the device 110 may be used for user recognition purposes, as well as other user 105 interaction purposes, such as video-enabled calls. As described below in reference to FIG. 10, the device 110 may include one or more non-voice based sensors (e.g., motion sensors, biometric sensors, radar or lidar, heartrate sensor, etc.) for performing user recognition.

The device 110 may be associated with a group profile that may include one or more users 105. In some embodiments, user profile information may be stored in the local storage 160 of the device 110. For example, the device 110 may be a virtual assistant device in a home with a group profile that includes the members of the home. The members of the group profile may each be a respective user 105 of the device 110 with a configured user profile. As described below in reference to FIG. 6, a profile storage 170 may store user data corresponding to each user profile. The user data may include demographic information and/or user preferences, such as preferred music or movie genres. The user data may include device information associating a user profile with one or more devices.

The users 105, such as members of a household, may register or enroll with a particular device 110 and/or group profile. The registration process may include providing information such as name and interests. Additionally, the device 110 may collect data for performing non-voice user recognition. In some embodiments, the device 110 may capture images of a particular user's face for performing facial recognition. In some embodiments, the device 110 may capture biometric data, such as one or more fingerprints of the user 105. The user recognition data may be stored at the local storage 160 of the device 110 and referenced, such as by the user recognition component 195, when facial recognition is performed. During the registration process, or similar processes that may include providing personal information or images, the user 105 may provide permission or consent to use their personal data, such as facial image data for facial recognition, for identification purposes. In some embodiments, user recognition, such as facial recognition, is performed by the user recognition component 195 at the device 110 to determine a user identifier (which may identify the user and/or her individual user profile) and thus transmitting the user identifier from the device 110 to the system component(s) 120. In this way, a local device 110 may perform user identification without necessarily transmitting other data (e.g., raw image data) outside the user's home environment.

Referring to FIG. 1, when one or more people are within a proximity of the device, or field of view of the camera of the device 110, the device 110 may perform user recognition to identify a user 105. In some embodiments, the presence detection component 194 may determine the presence and/or location of one or more users 105 (e.g., a person within the proximity of the device) using a variety of data, as described in greater detail below with regard to FIG. 12. In some embodiments, the camera of the device 110 may capture images and the images may be sent to the image processing component 155. As described in greater detail below in reference to FIG. 9, the image processing component 155 may perform computer vision functions such as object recognition, modeling, reconstruction, etc. For example, the image processing component 155 may detect a person, face, animal, etc.

In some embodiments, the image determined by the image processing component 155 may be provided to the user recognition component 195. In other embodiments, the user recognition component 195 may receive image data from the camera of the device 110. As described in more detail below in reference to FIG. 10, a vision component 1008 of the user recognition component 195 may receive data from one or more sensors capable of providing images (e.g., cameras) or sensors indicating motion (e.g., motion sensors). The vision component 1008 may perform facial recognition or image analysis to determine an identity of a user 105 and to associate that identity with a user profile associated with the user 105.

In some embodiments, the device 110 may include a biometric sensor, such as a fingerprint reader. The biometric sensor may be incorporated into a physical button of the device 110. In such embodiments, the user recognition component 195 may receive biometric data (e.g., fingerprint data, iris data, etc.) from the biometric sensor of the device 110. The user recognition component 195 may perform user recognition using the biometric data and user biometric data stored in the local storage 160, and as described below in reference to FIG. 10.

The touch detection component 150 of the device 110 may be configured to detect receiving a physical touch by a user 105, such as on the touch screen 111 of the device 110, physical input mechanisms (e.g. buttons), and similar input mechanisms, and generate touch input data. The touch input data may be provided as input to the touch manager 115. The device 110 may include a touch-sensitive screen 111. Touch screen 111 may correspond to a display device and/or display screen, which may be any size and/or shape and may be located at any portion of electronic device 110. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen 111 may, in some embodiments, correspond to a display device including capacitive sensing panels capable of recognizing touch inputs thereon. For instance, touch screen 111 may correspond to a projected capacitive touch ("PCT"), screen include one or more row traces and/or driving line traces, as well as one or more column traces and/or sensing lines.

Touch screen 111, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of touch screen 111, a capacitance between the object and the conductive material may be formed. Processor(s) may be capable of determining a location of the touch screen associated with where the capacitance change is detected, and may register a touch input as occurring at that location.

In some embodiments, touch screen 111 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any suitable number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on touch screen 111 corresponding to where a conductive object contacted touch screen 111.

A change in capacitance may be measured to determine a location on the touch screen where the object has contacted the surface. For example, if an individual touches a point on touch screen 111, then a corresponding driving line and sensing line that intersect at that point may be identified. A location of the point may have one or more pixels associated with that location, and therefore one or more actions may be registered for an item or items that are displayed at that location. Processor(s) of electronic device 110 may be configured to determine which pixels are associated with a particular location point, and which item or items are also displayed at that pixel location. Furthermore, electronic device 110 may be configured to cause one or more additional actions to occur to the item or items being displayed on touch screen 111 based on a temporal duration the touch input, and or if one or more additional touch inputs are detected. For example, an object that contacted touch screen 111 at a first location may be determined, at a later point in time, to contact touch screen 111 at a second location. In the illustrative example, an object may have initially contacted touch screen 111 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen 111 having 100 driving lines and 100 sensing lines may have 100 intersection points, and therefore 100 individual capacitors, while a touch screen 111 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen 111 having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 110, and therefore the fewer driving lines and/or sensing lines used, the smaller the amount of power that is needed to operate the touch screen display.

The touch manager component 115 and/or the application(s) 135 of the device 110 may be configured to receive touch input data corresponding to a touch event, such as a touch input at the touch screen 111 of the device 110 as determined by the touch detection component 150. The device 110 may display touchable targets (or GUI elements) on the touch screen 111, such as buttons, lists, scroll bars, check boxes, text areas, etc., which may be touched by the user 105. In some instances, the user 105 touching one of the touchable targets is a selection of the touchable target. For example, the device 110 may display, in response to a user request to play music, three button images that each correspond to a different genre of music. The user 105 may touch one of the displayed button images to select the genre of music they prefer to hear.

When the user 105 touches the touch screen 111 and is detected by the device 110, a touch input occurs. The touch detection component 150 may translate the touch data to coordinates corresponding to the images displayed on the touch screen 111, such as button images. The touch detection component 150 provides touch data of the detected user touch input to the touch manager component 115. The touch manager component 115 may then determine a user selection, or selection data 140, based on the coordinate correspondence to the displayed images. The selection data 140 may indicate a user interface element that corresponds to the location on the touch screen 111, or display coordinates, of the touch input. Alternatively, or in addition, the touch detection component 150 and touch manager component 115 may together or individually perform one or more of these actions.

In some embodiments, the touch input data may correspond to a touch or depression of a physical button of the device 110 (e.g., volume button, preference button, etc.) The touch manager component 115 may determine selection data 140 from the touch input data based on the button that received the physical input from the user 105, and in some instances the images or data presently displayed on the touch screen 111. For example, a device 110 may have one or more physical buttons and display, on the touch screen 111, images below a respective button. A user 105 may depress one of the physical buttons to provide a selection indication (e.g., selection data 140) for the respective image displayed below the button.

In some embodiments, the touch manager component 115 may send the selection data 140 to the system component(s) 120. For example, the touch manager component 115 may send the selection data 140 to the orchestrator component 130. In some embodiments, before sending the selection data 140 to the orchestrator component 130, the touch manager component 115 may determine if the user recognition component 195 has determined an identity for the user 105. In some instances, the user 105 may have provided voice input commands to the device 110 and the user recognition component 195 may have identified the user 105 based on the voice input, and as described below in reference to FIG. 10. However, if the user 105 has not previously provided a voice input and/or the device 110 has not received a voice input within a time window preceding the touch input, the identity of the user 105 that provided the touch input may be unknown. As described above, face recognition may be performed by the user recognition component 195 to determine an identity and/or a user profile for the user 105. The touch manager component 115 may associated the user recognition data 196 with the selection data 140 and then send the selection data 140 with the associated user recognition data 196 to the orchestrator component 130 of the system component(s) 120.

Figure 4A:
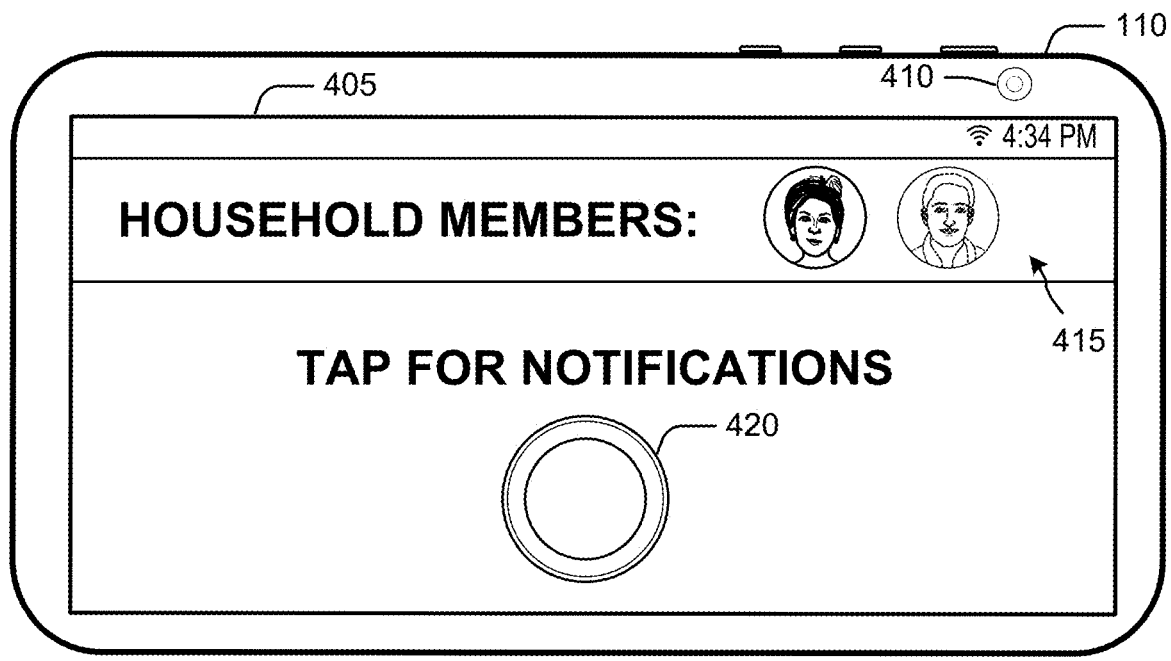
FIGS. 4A and 4B illustrate a notification screen for a touch screen enabled electronic device, according to embodiments of the present disclosure.
Figure 4B:
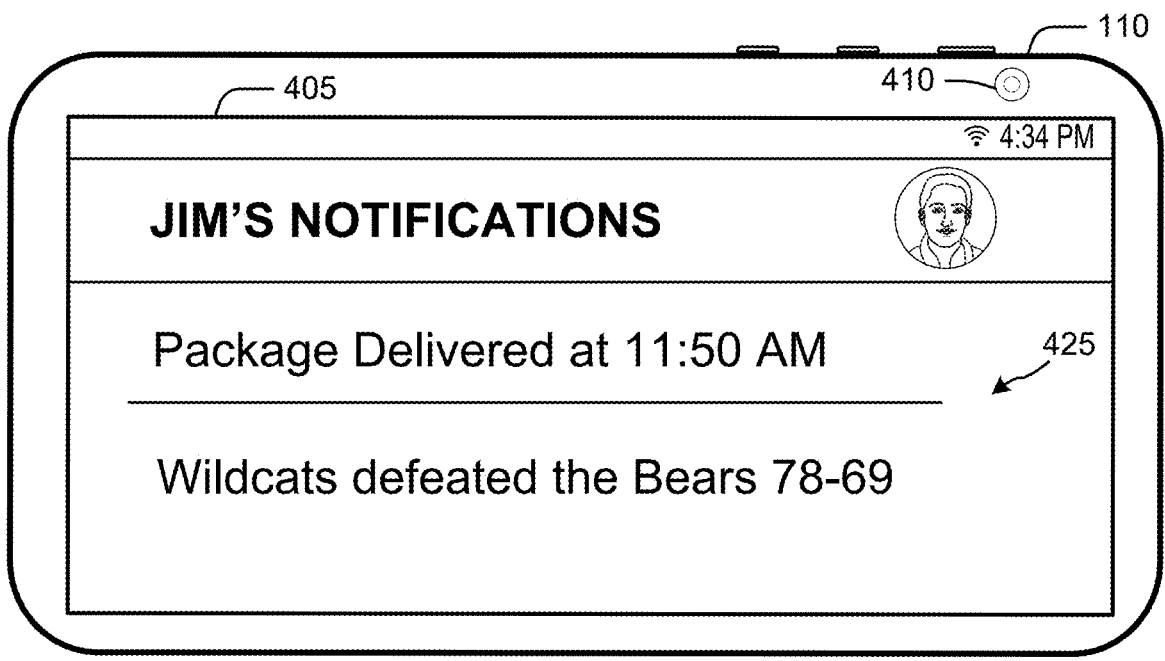

In other embodiments, the touch manager component 115 may send the selection data 140 and, if determined, the user recognition data 196 to one of more application(s) 135 of the device 110. The application(s) 135 may execute on the device 110 and may receive data directly from the components of the device 110, such as the user recognition component 195 and local storage 160. The application(s) 135 may use the selection data and the user recognition data 196 to generate output for display on the touch screen 111 of the device 110. Providing data, such as the selection data 140 and user recognition data 196, directly to an application 135 of the device 110 may minimize the data that is transmitted across the network 199 to the system component(s) 120, thus potentially reducing latency. As shown in FIGS. 4A and 4B, notifications customized to a particular user 105 may be displayed on the device 110. In an example of providing data directly to an application of the device 110 to reduce latency, the device 110 may store notification data in the local storage 160. When the selection data 140 indicates notifications and the user recognition data 196 may be provided to a notification application of the device 110. The notification application may access the local storage 160 for user specific notification data corresponding to the user recognition data 196 and generate output for display, such as illustrated in FIG. 4B.

As described below in reference to FIG. 6, the orchestrator component 130 may direct received input, such as selection data 140, to a skill component(s) 190. For example, if the selection data 140 indicates a touch input to a GUI associated with a particular skill 190a, the orchestrator 130 may send the selection data 140 to that skill 190a. A skill component may be software running on the system component(s) 120 that is akin to a software application. That is, a skill component 190 may enable the system component(s) 120 to execute specific functionality in order to provide data or produce some other requested output, such as in response to a user input (e.g., voice command or touch selection).

The skill component 190 may additionally receive the user recognition data 196. The user recognition data 196 may include a user identifier. The skill component 190 may use the user identifier to access additional information about the user 105, such as name and preferences, from the profile storage 170, depending on the user's preferences and permissions as indicated with regard to the particular skill 190. The skill component 190 may use the profile information to personalize the generated output data 145 according to the user's preferences and permissions. For example, if the skill component 190 is a notification skill, the skill component 190 may determine a set of notifications that are specific to the user 105, such as sports scores for teams the user 105 has an interest.

The output data 145 generated by the skill component 190 may be sent, such as via the orchestrator component 130, to the device 110. The received output data 145 may then be output by the device 110, for example displayed on the screen 111 of the device 110. The displayed output data 145 may be personalized for the user 105 that was identified, such as by face recognition, at or near the time of the device 110 receiving the touch input. For example, the device 110 may display notifications that a personalized for a particular user 105, as illustrated in FIG. 4B. In some embodiments, one or more applications 135 may receive the output data 145. The one or more applications 135 may further process the output data 145 before generating display data for presentation on the touch screen 111 of the device 110.

In some embodiments, the device 110 may generate audio output from the output data 145, such as using a TTS component 780. As described below in reference to FIG. 13, the TTS component 780 may generate speech using different speaker identities, with each speaker identity including different features such as voice and speaking style. The user profile stored in the profile storage 170 may include data identifying one or more speaker identities preferred by the user 105. The audio output generated from the output data 145 may be customized, such as with a particular speaker identity, to the user 105 based on receiving the user recognition data 196 with the selection data 140. In some embodiments the output data 145 may include audio data determined by TTS component 680 as part of the system component(s) 120. In such a situation the device 110 may output the audio data using its loudspeakers, e.g., 1412 discussed below.

Figure 12:
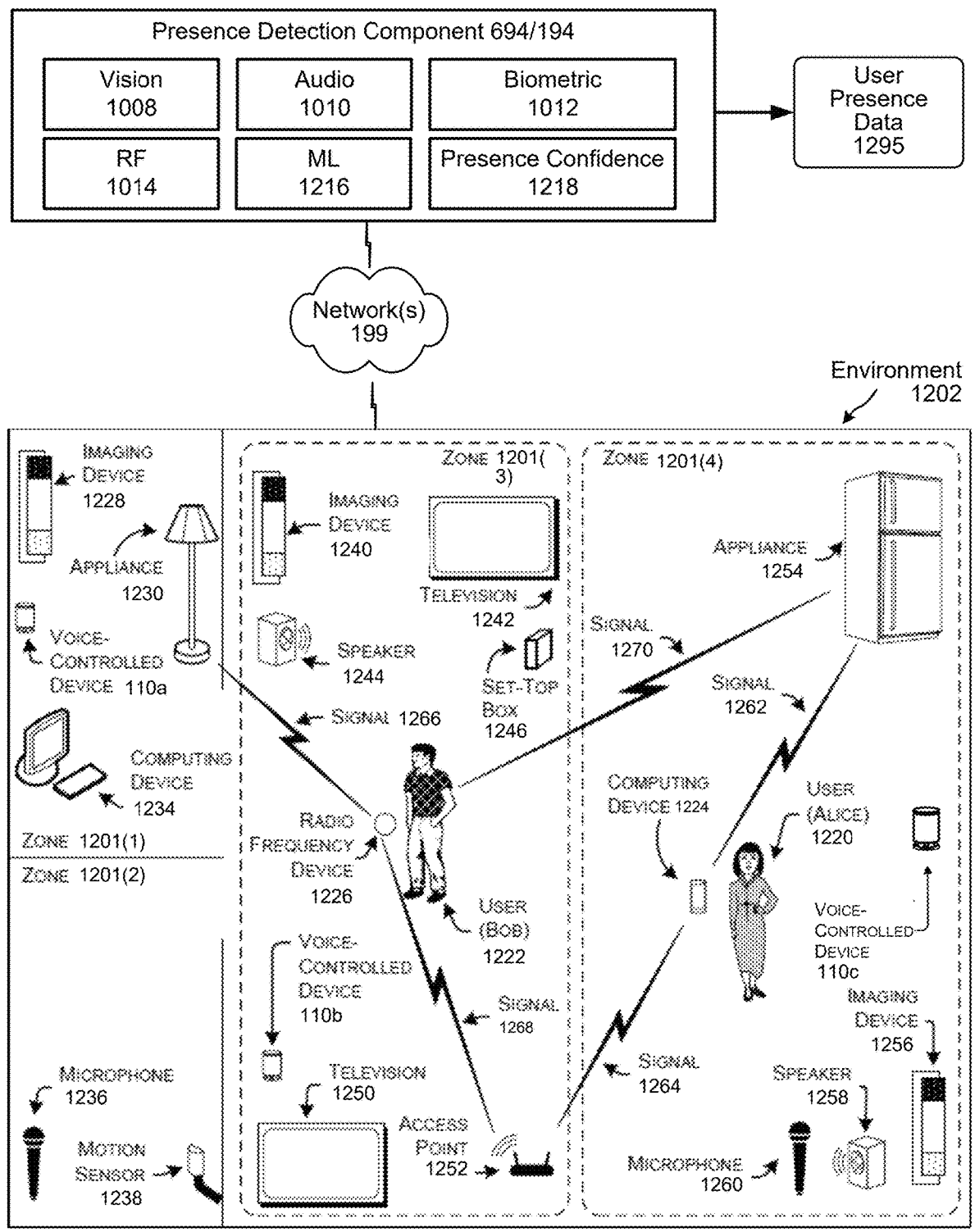
FIG. 12 is a schematic diagram of an illustrative architecture in which sensor data is combined to determine the presence and/or location of one or more users according to embodiments of the present disclosure.

The orchestrator 130 may use the associated user recognition data 196 and selection data 140, where the selection data 140 may indicate a physical touch interaction has occurred, for additional operations and features, such as presence detection as described in reference to FIG. 12. The orchestrator 130 may provide the associated user recognition data 196 and selection data 140 to additional skill component(s) 190 and application(s) of the virtual assistant system 100. For example, if someone is attempting to reach the user 105 using an intercom functionality of the devices 110 in the group profile, the intercom application may use the location of the user 105 (derived from the selection data 140) to determine the device 110 to direct the intercom message.

For illustrative purposes the selection data 140 and user recognition data 196 are shown in FIG. 1 as being sent from the touch manager component 115. However, the user recognition data 196 may be sent from the user recognition component 195, in some embodiments, to the orchestrator component 130. Additionally, an input/output device interface 1402 may perform the sending and receiving of data, as described below in reference to FIG. 14.

In some instances, multiple people may appear concurrently in the field of view of the camera for the device 110. The user recognition component 195 may determine which person is closer (i.e., the least or shorter distance) to the device 110 and perform facial recognition for the closest person and determine the user identifier for that closest person. Using the methods and techniques described below in reference to FIG. 9, image processing may be performed to determine the person (e.g., user 105) that is closer to the device. For example, the image processing component 155 may determine which person's face is larger within the field of view. Further, the image processing component 155 may determine if the face of a first user is blocked or partially blocked by the face or head of the second user. The closer user 105 may also be determined using a proximity sensor, such as in conjunction with presence detection component 694, where the proximity sensor may provide data indicating that the head and/or face of one user is determined to be closer than the head and/or face of another user.

Should a touch input be received, within a time window of identifying a user profile for the closest user, the user identifier of the closest person may be associated with the touch input. In some instances when multiple people are within the field of view of the camera, the people may be moving and thus the person identified as the closest person to the device 110 may shift. In such an instance, the touch manager component 115 may associate the user profile of the person that was determined to be closest to the device 110 at the time the touch input was received. In some instances, the time window may vary based on the number of people determined/detected within a proximity of the device 110. For example, if one person is detected near the device 110, it is less likely that another user may provide a touch input, and thus the time window for re-identifying the user 105 may be greater (e.g., 30 seconds). However, if multiple people are detected near the device 110, there is a higher likelihood that a different person (e.g., second user), from the originally identified user 105, may provide a touch input. Thus, the time window for re-identifying the user 105 may be decreased (e.g., 5 seconds).

Additionally, as described below in reference to FIG. 8, a system directed input detector 785 may determine which user 105, of multiple users, is interacting with the device 110 (rather than interacting with other devices, another user, etc.). The system directed input detector 785 may determine system directed detector (SDD) result data 842 based on image data 721 (e.g., images captured from a camera of the device 110) and/or audio data 611 (e.g., voice inputs captured by a microphone of the device 110). The touch manager component 115 may use the SDD result 842 to associate a user recognition data 196 (such as determined from facial recognition) with a touch input when multiple users are determined to be within the field of view of the camera of the device 110.

A touch screen enabled device 110 may provide recommendations to a user 105. For example, a user 105 may watch a video and afterward the virtual assistant system 100, via the device 110, may provide recommendations for additional videos to watch. More accurate and/or helpful recommendations may be made if additional information about the user 105 is known, such as the user's viewing history. However, should the device 110 receive user inputs which do not include user identifiable information, such as a touch input on the touch screen 111, the device 110 may not have information to determine the identity of the user, such as a voice input to perform voice recognition. Instead, the methods and techniques described herein may include the device 110 capturing images of user(s) within a proximity of the device 110 and performing facial recognition to identify the user 105. The user identity, such as a user identifier, may be provided to a recommendation application or skill to determine more accurate and/or helpful recommendations for the user 105 when the user 105 requests recommendations via a touch input (e.g., selecting a recommendations user interface element).

The virtual assistant system 100 may block access or performance of certain actions based the user identifier associated with the touch input. For example, the primary users (e.g., adults) of a device 110 in a home may add the other members of the household to the group profile. The primary user, or administrator, of the group profile may designate certain users as children. This designation may be made to prevent some users of the group profile from performing certain actions, such as making online purchases. In an instance, a first user may initiate an action (such as ordering a pizza), by pressing a corresponding GUI to order the pizza. Before completing the order, the virtual assistant system 100 may provide output data 145 for display on the device 110 to confirm the action. The touch manager component 115 may receive a touch input data indicating a confirmation of the action. However, along with selection data 140 indicating the touch selection to order the pizza, the touch manager component 115 may also send the system component(s) 120 user recognition data 196 indicating an identifier of the first user. The system component(s) 120 may send the touch input data and user identifier to a skill 190 for ordering the pizza which may determine, based on factors such as user preferences/permissions, etc. that the first user is a child, the order may be rejected and a display output (based on output data 145) may be generated indicating the rejection.

In another example, system operations may avoid a command entered by one authorized user but attempted to be confirmed by a second, unauthorized user. For example, a first (authorized user) may initiate an action, for example by pressing a corresponding GUI to initiate the action. Before completing the action, the virtual assistant system 100 may provide output data 145 for display on the device 110 to confirm the action. The touch manager component 115 may receive a touch input data indicating a confirmation of the action. However, the touch manager component 115 may determine that the user profile of the second user 105 performing the confirmation touch interaction (as indicated by the user recognition component 195) is different from user profile of the first user that initiated the action. If the system determines that the second user, or user that provided the touch confirmation, is a child or other user not authorized to allow the action, then the confirmation may be rejected and a display output may be generated indicating the rejection.

While restricting use and access for certain performances is describe here using children, such restrictions may be applied to any member of the group profile, such as limiting time spent on social media.

Figure 2A:
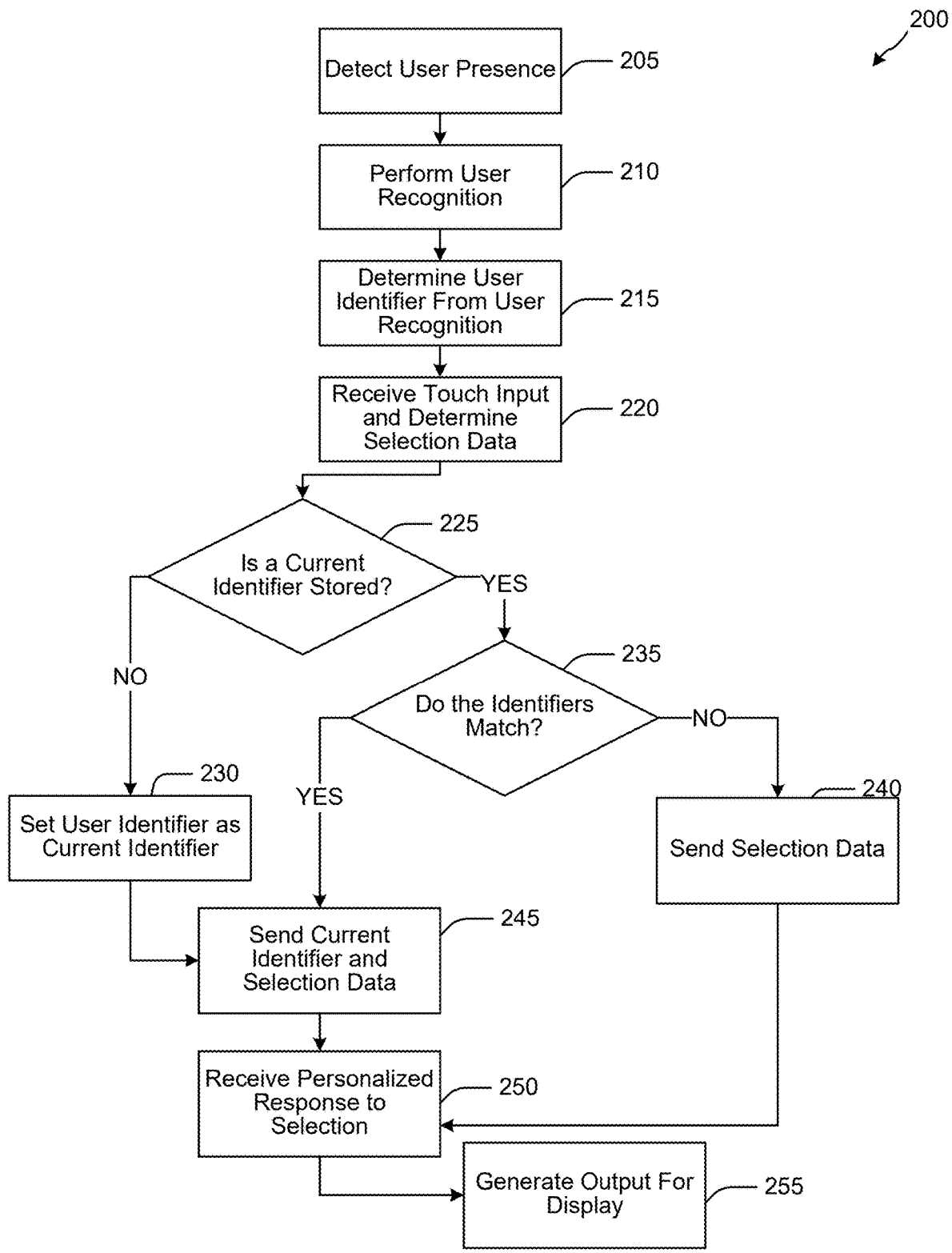
FIGS. 2A and 2B are flowcharts illustrating operations of an example method of user profile attribution for a non-voice touch screen interaction with a virtual assistant system, according to embodiments of the present disclosure.
Figure 2B:
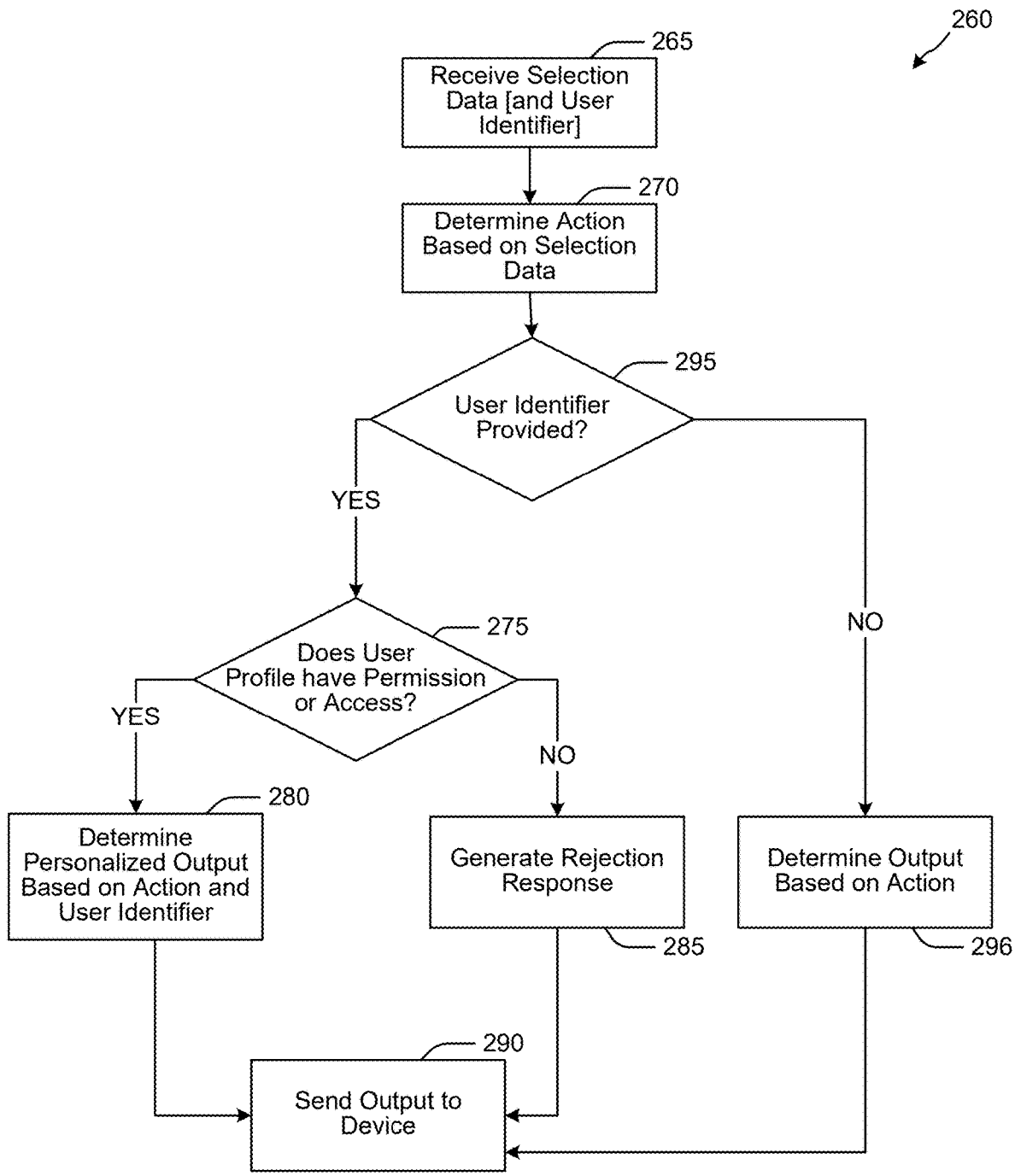

FIGS. 2A and 2B are flowcharts illustrating operations of an example method 200 of user profile attribution for a touch interaction with a device 110 and a virtual assistant system 100, according to embodiments of the present disclosure. The method 200 (illustrated in FIG. 2A) may be performed by a touch screen enabled electronic device 110 that is capable of capturing images, such as via a camera of the device 110. The method 260 (as illustrated in FIG. 2B) may be performed by the system component(s) 120 of the virtual assistant system 100.

The method 200 may include detecting (205) the presence of a user 105 within the field of view of the camera of the device 110. In some embodiments, the presence detection component 194 may determine the presence of one or more users 105, as described in greater detail below with regard to FIG. 12. Presence detection may continuously be performed (as described in performance of operation 205) to determine users 105 that move in and out of proximity of the device 110. Additionally or alternatively, the user recognition component 195, camera 1418, etc. may detect the presence of one or more users 105.

The method 200 may include performing (210) user recognition when a user presence is detected. As described below in reference to FIGS. 10 and 11, the user recognition component 195 may perform facial recognition processing using the captured images of the detected user 105. The user recognition component 195 may determine (215) user recognition data 196 from the facial recognition performance. In some embodiments, facial recognition may be performed multiple times per second. In some embodiments, the user recognition component 195 may perform user recognition using biometric data. The user recognition data 196 for a user 105 may include a user identifier that corresponds to a user profile. The device 110 may be associated with a group profile that includes multiple members and each member has a respective user identifier. The user recognition data 196, including the user identifier, may identify a corresponding member of the group profile. The group profile associated with a device 110 may include reference data for user recognition to identify a user 105. The reference data may include voice reference data, image reference data, biometric data, etc. that may be used for user recognition processing (e.g., facial recognition processing, voice recognition, etc.), as described in reference to FIGS. 10 and 11.

User profile data may be stored in the profile storage 170 as part of the system components(s) 120 and as illustrated in FIG. 1. Additionally or alternatively, the device 110 may include a local storage component 160. In some embodiments, user profile data may be stored at both the local storage 160 of the device 110 and at the profile storage 170 of the system component(s) 120. For example, the local storage 160 may store an image of a user 105 for display on the device 110 (such as illustrated in FIGS. 4A and 4B), while additional user profile data (e.g., preferences, access, permissions, and demographic information) may be stored at the profile storage 170 of the system component(s) 120 for access by the skill component(s) 190. The device 110 may store facial recognition data and/or biometric data for performing user recognition, corresponding to the one or more users 105 of the device 110. The facial recognition data and/or biometric data may be shared with the system 100 and/or other devices depending on preferences controlled by the user 105.

The method 200 may include receiving (220) a touch input and determining selection data corresponding to a user interface element associated with the touch input. As described below in reference to FIG. 3 and in some embodiments, the touch manager component 115 may receive touch input data, such as screen coordinates for the touch input, as well as displayed screen data to determine the user interface element corresponding to the touch input.

In some instances, a user identifier, or current user identifier, may have been established, and/or regularly or continuously updated by the user recognition component 195. In some cases, prior to receiving the touch input, if a user 105 provided a voice input, then the current user identifier may be set using the user identifier determined from performing voice recognition for the voice input. The current user identifier may indicate the user who should be associated with any touch inputs received by the device 110. The current user identifier may be valid, or cached, for a limited time window (such as eight seconds), where if a subsequent input (e.g., voice, touch, etc.) is not received within the time window, then the user identifier set as the current user identifier is discarded, invalidated, and/or erased. Thus, the method 200 may include determining (225) if a current user identifier has a valid value (e.g., a user profile identifier) or does not have a valid value. If a current user identifier does not have a valid value, then the method 200 continues by setting (230) the user identifier determined at operation 215 as the current user identifier.

In the alternative, if the method 200 determines (225) that a current identifier is stored, then the method 200 may include determining (235) if the user identifier (determined at operation 215) and the stored current user identifier are the same. If the user identifier and the current user identifier do not match, then the method 200 may include sending (240) and the determined selection data to the orchestrator 130 of the system component(s) 120 without a user identifier, and as described in reference to FIG. 1.

From the operation 230, the method 200 may include sending (245) the current profile and the determined selection data to the orchestrator 130 of the system component(s) 120, and as described in reference to FIG. 1. Similarly, if the decision 235 determines the user profile and current user profile are the same profile, then the method 200 also proceeds to operation 245.

The method 200 may include receiving (250) a response of the personalized output data from the system component(s) 120 (sent in operation 290 noted below). The method 200 may then include generating (255) output for display on the display screen of the device 110 using the personalized output data.

As shown in FIG. 2B and corresponding to operation 240 or operation 245, the method 260 may include receiving (265) the selection data 140 and the user identifier, corresponding to the current identifier from operation 245 or the selection data 140 from operation 240. The method 260 may include determining (270) an action corresponding to the selection data 140, and as described in reference to FIG. 1. The method 260 may include determining (295) if a user identifier was provided.

If, at decision 295 the system determines that a user identifier was provided, then the method 260 may include determining (275) if the user identifier has permission to perform the action determined at operation 270. The profile storage 170 may include user profile data indicating the types of actions and applications the user 105 has permission or access, as well as subscriptions, such as for services or additional features. The system 100, such as by the orchestrator 130, may determine using the profile data corresponding to the user identifier if the user 105 has permission and/or authorization for the action determined from the selection data 140. For example, if the user profile corresponds to a child and the determined action is to complete an online purchase, then it may be determined the user profile does not have permission to perform the determined action. The method 260 may include determining (280) personalized output based on the determined action and the user identifier. The orchestrator component 130, skill component(s) 190, and other components (such as those described in reference to FIG. 6) of the system component(s) 120 may determine personalized output data based on the determined action and current profile, such as a profile determined using the user identifier.

Alternatively, at decision 275, if the system determines that the user identifier does not have permission or access to the determined action, then the method 260 may include generating (285) a rejection response. For example, the rejection response may be a message that the member of the group profile corresponding to the user profile does not have permission for the determined action (e.g., "Sorry, Susan does not have permission to complete the food order from the grocery store.")

Alternatively, at decision 295, if the system 100 determines that a user identifier was not provided, then the method 260 may include determining (296) output based on the action alone. In other words, operation 296 determines non-personalized output, as a user identifier was not provided. For example, if the action is a request for news, then a general selection of top headlines may be presented. From the operation 285, operation 280, or operation 296, the method 200 may include sending (290) output to the device 110 (received in operation 250 discussed above).

Figure 3:
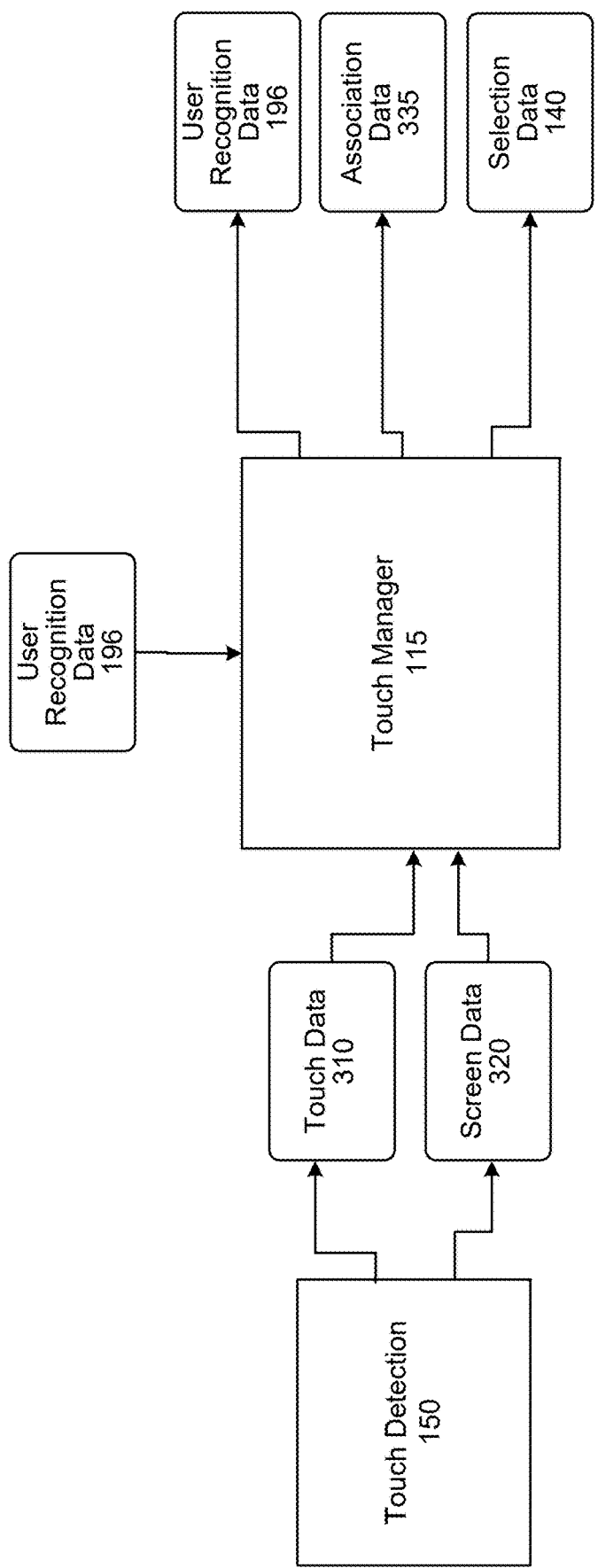
FIG. 3 is a conceptual diagram of a touch detection manager component configured to process touch screen related data, according to embodiments of the present disclosure.

FIG. 3 is a conceptual diagram of a touch manager component 115 configured to process touch screen inputs, according to embodiments of the present disclosure. The touch manager component 115 may receive as input touch data 310 and, in some embodiments screen data 320, from the touch detection component 150. The touch data 310 determined by the touch detection component 150 may include information corresponding to a received touch event, such as the screen coordinates corresponding to the location the touch event occurred. The screen data 320 may include information identifying the user interface elements that were displayed on the screen at the time of the touch event. User interface elements may include application icons, menu buttons, notification alert button (such as a bell), images corresponding to media content (e.g., a movie poster representing a movie for viewing), etc.

The touch manager component 115 may determine selection data 140 based on the touch data 310 and the screen data 320. The selection data 140 may indicate the user interface element that corresponds with the touch data 310. In some embodiments, the touch manager component 115 may determine an action and/or command corresponding to the selection data 140. The action and/or command may be included in the selection data 140.

The touch manager component 115 may receive user recognition data 196, such as from the user recognition component 195. In some embodiments, the touch manager component 115 may use the user recognition data 196 to determine a user identifier. For example, the local storage 160 of the device 110 may store a set of user profiles that are associated with the members of the group profile for the device 110. In some embodiments, he touch manager component 115 may determine the member (e.g., the user identifier) from the group profile that corresponds with the user recognition data 196.

In some embodiments, the touch manager component 115 may generate association data 335 that identifies an association between the user recognition data 196 and the selection data 140. The touch manager component 115 may output the user recognition data 196, the selection data 140, and/or the association data 335. In some embodiments, the touch manager component 115 may send, such as via input/output device interface 1402, the user recognition data 196, the selection data 140, and/or the association data 335 to the system component(s) 120.

FIGS. 4A and 4B illustrate a notification screen for a touch screen enabled electronic device 110, according to embodiments of the present disclosure. As illustrated in FIG. 4A, the device 110 may have a display screen 405 and a camera 410. The display screen 405 may display information, such as a section 415 identifying the members of the group profile (e.g., household members) associated with the device 110. When new notifications have arrived for one or more of the members of the group profile, an option to display notifications corresponding to a member may be presented. For example, a user interface button 420 may be displayed on the display screen 405 as a notification alert for the members of the group profile and the user interface button 420 may be to tapped or touched by a user 105 to display notifications.

As illustrated in FIG. 4B, when a member of the group profile (e.g., "Jim") taps the user interface button 420, the display screen 405 may display notifications 425 that correspond to the identified member of the group profile. As described above, the camera 410 may capture images of a user 105 within the field of view of the camera 410. The user recognition component 195 may perform facial recognition processing to identify the user 105 (e.g., "Jim"). If a touch input corresponding to the user interface button 420 is received within a time window of the identified user 105 being within the field of view of the camera 410, then an action may be performed to display notifications that correspond to the identified user 105.

Figure 5:
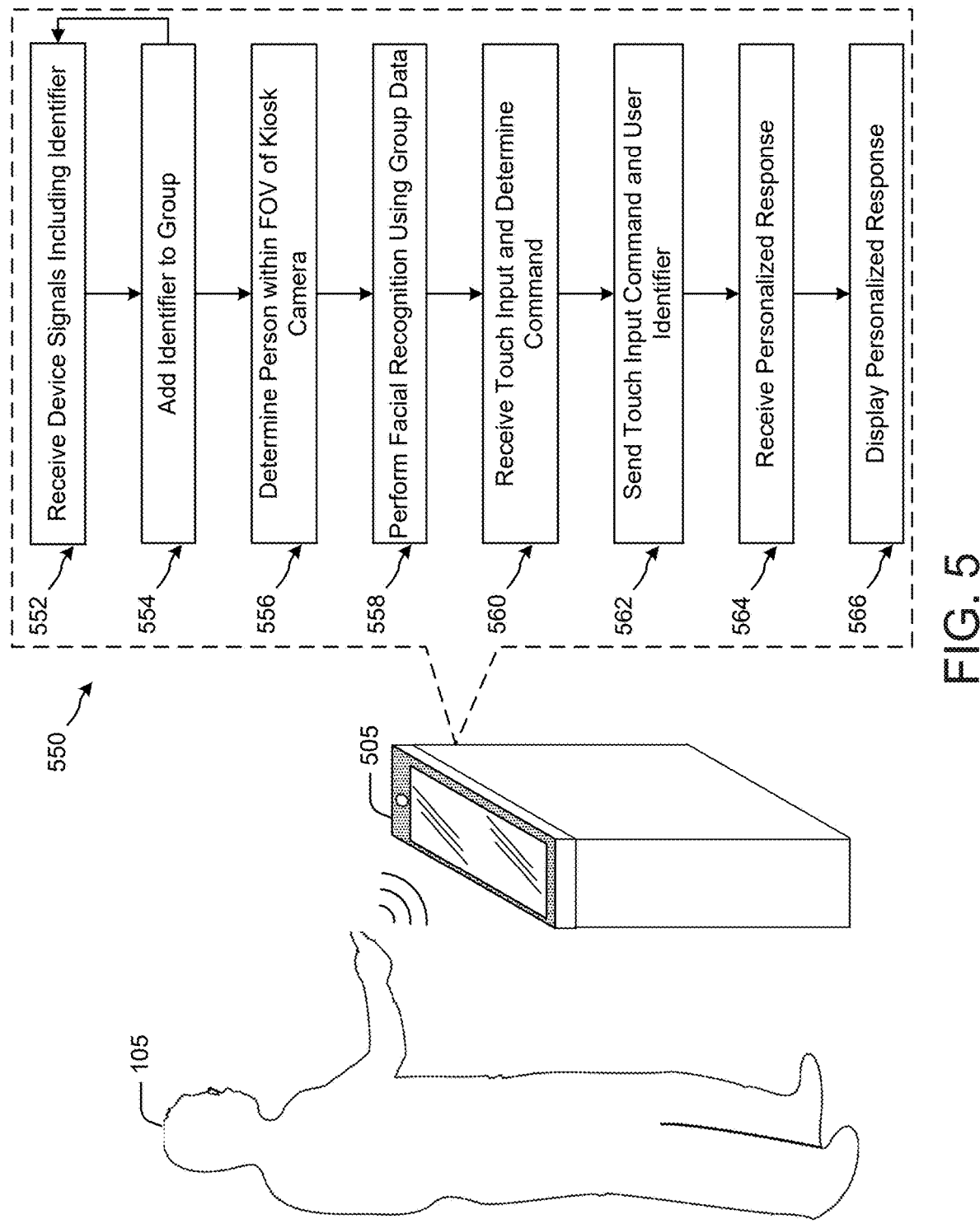
FIG. 5 illustrates a touch screen enabled electronic device as part of a public-accessible kiosk, according to embodiments of the present disclosure.

FIG. 5 illustrates a touch screen enabled electronic device 110 as part of a public-accessible kiosk 505, according to embodiments of the present disclosure. In some embodiments, the touch screen enable electronic device 110 may be incorporated into a public-accessible kiosk 505, such as a kiosk found at an airport for passengers to check-in, a self-service check-out kiosk at a store, or at an amusement park for guests to access information and perform actions like adding funds to their account. While not illustrated in FIG. 5, the device 110 and/or kiosk 505 illustrated in FIG. 5 may be in communication, via the network 199, with system components(s) 120 of system 100, similar to the device 110 as shown in FIG. 1.

As illustrated in FIG. 5, a user 105 may approach the kiosk 505. The kiosk 505 may receive signals from a personal device, such as a smart phone or radio frequency (RF) enabled wristband. The personal device may emit RF signals (e.g., Wi-Fi, Bluetooth®, etc.). The kiosk 505 may determine that a received RF signal is associated with a personal device, and the personal device may be associated with a particular user identifier. For example, a user 105 may register their personal device with the system 100 and create an association between the personal device (based on a device identifier) and their user profile (based on a user identifier that corresponds to the user profile).

However, in such scenarios where the kiosk 505 is in a public area and is meant for use by thousands of potential people, the kiosk 505 may receive signals from multiple personal devices at any particular instance. Additional data, such as signal strength may not be useful in determining the user 105 currently accessing the kiosk 505, as multiple personal devices may be detected with similar signal strength (e.g., a family standing around the kiosk). The methods and techniques described herein may be used to determine the user 105 providing a touch input to the kiosk 505 when multiple potential users are present.

As shown in FIG. 5, the kiosk 505 may be configured to perform a method 550. The method 550 may include receiving (552) signals, such as RF signals (e.g., Wi-Fi, Bluetooth®, etc.), from devices within a proximity of the kiosk 505. The signals may include data such as a device identifier, user identifier, and/or proprietary identifier corresponding to the kiosk 505 (e.g., a passenger identifier for an airline). The method 550 may include adding (554) the received identifier to a group of identifiers. The operations 552 and 554 may continuously be performed as new personal devices come within the proximity of the kiosk 505 and the respective signals of the new personal devices are received. Additionally, identifiers may be removed from the group of identifiers, such as based on a timeout period. For example, if a subsequent signal is not received from a personal device within a timeout period, then the identifier corresponding to the personal device may be removed from the group of identifiers.

In some embodiments, operation 552 may not be performed and the group of identifiers may be based on people providing an identifier when entering an enclosed environment, such as a store. As people enter the enclosed environment, they may provide an identification, such as via a communication with their device, scanning of an image (e.g., quick response (QR) code), or a physical identification (e.g., driver's license or credit card). The operation 554 may include adding the corresponding user identifier to the group of identifiers based on the identification provided upon entry.

The method 550 may include determining (556) if one or more people are within the field of view of the camera of the kiosk 505. For example, the kiosk 505 may be configured to determine if a face is present (but not necessarily perform facial recognition) in images captured by the camera of the kiosk 505. Upon determining the presence of faces in the captured images, the method 550 may include performing (558) facial recognition to identify a person (e.g., user 105) that is present at the kiosk 505. In some embodiments, the identity of the person may be determined based on the signals provided from the device and operations 556 and 558 may not be performed.

The facial recognition of operation 558 may perform facial recognition by requesting user profile data, including facial recognition data, from the profile storage 170 of the system component(s) 120. The kiosk 505 may request user profile data based on the user identifiers in the group of identifiers. The number of potential users for a public-accessible kiosk 505 may be prohibitively too large to store user profile data locally at the kiosk 505. Instead, the group of identifiers may be used as a pool of potential users and face recognition may be performed using user profile data corresponding to the group of identifiers, similar to the members of the group profile describe above in reference to FIG. 1. By having the kiosk 505 requesting and storing data limited to those users 105 identified in the group of identifiers, the amount of data that may be required to be stored by the kiosk 505 is limited and the face recognition processing time may be reduced because of the limited number of potential users 105 that may be using the kiosk 505. Using the amusement park as an example, instead of using facial recognition cross referenced with data corresponding to every guest that is attending the amusement part on a particular day (based on the guest previously registering and providing consent to use their personal information), the kiosk 505 may limit the pool of potential users 105 based on the devices detected within a proximity of the kiosk 505 and thus added to the group of identifiers.

Alternatively, the kiosk 505 and/or system component(s) 120 in communication with the kiosk 505 may not store or have access to user recognition data (e.g., facial recognition data, biometric data, etc.) In some instances, the user recognition data may be encrypted. In some embodiments, the kiosk 505 may request a user's personal device to assist in performing user recognition, such as providing the personal device with an image of the user 105 presently at the kiosk 505. The personal device may perform user recognition using the recognition data provided by the kiosk 505. If the personal device identifies the user 105 from the recognition data, the personal device may confirm the identity of the user 105 and/or provide the kiosk 505 with a user identifier.

The method 550 may include receiving (560) a touch input at the touch screen 111 of the device 110/kiosk 505. The touch input may be translated into a command based on determining the user interface element corresponding to the location of the touch input, and as described above in reference to FIGS. 1 and 2. The method 550 may include sending (562) the command based on the touch input and the user identifier determined from the face recognition to the orchestrator component 130 of the system component(s) 120 for processing, such as by the skill components(s) 190.

The method 550 may include receiving (564) a response that is personalized to the user 105 based on the user identifier determined from operation 558. The method 550 may include displaying (566) the personalized response, such as on the touch screen 111 of the kiosk 505.

In some embodiments, operations 562 and 564 may be performed and processed locally at the kiosk 505. For example, a kiosk 505 may display on the touch screen a general welcome screen encouraging guests to use the kiosk 505, such as "Tap the screen to begin." Using the methods and techniques described herein, when a touch input is then received at the touch screen of the kiosk 505, the guest may be recognized (such as described in reference to operation 558) so that a personalized message may be displayed to the guest (and without the guest directly providing any identifying information), such as "Welcome to Roller Coaster Heaven, Bob!"

For such publicly-accessible kiosks 505, the device 110 of the kiosk and the system 100 may only access personal user information, such as device identifiers, user identifiers, user information (such as name and demographics), and facial recognition information, if the user has provided permission to do so. For the example of the amusement park, the user 105 may, before visiting the amusement park, create an online account with the amusement park where the user provides such information and agrees to terms for the use of such information while the user 105 is visiting the amusement park.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 6:
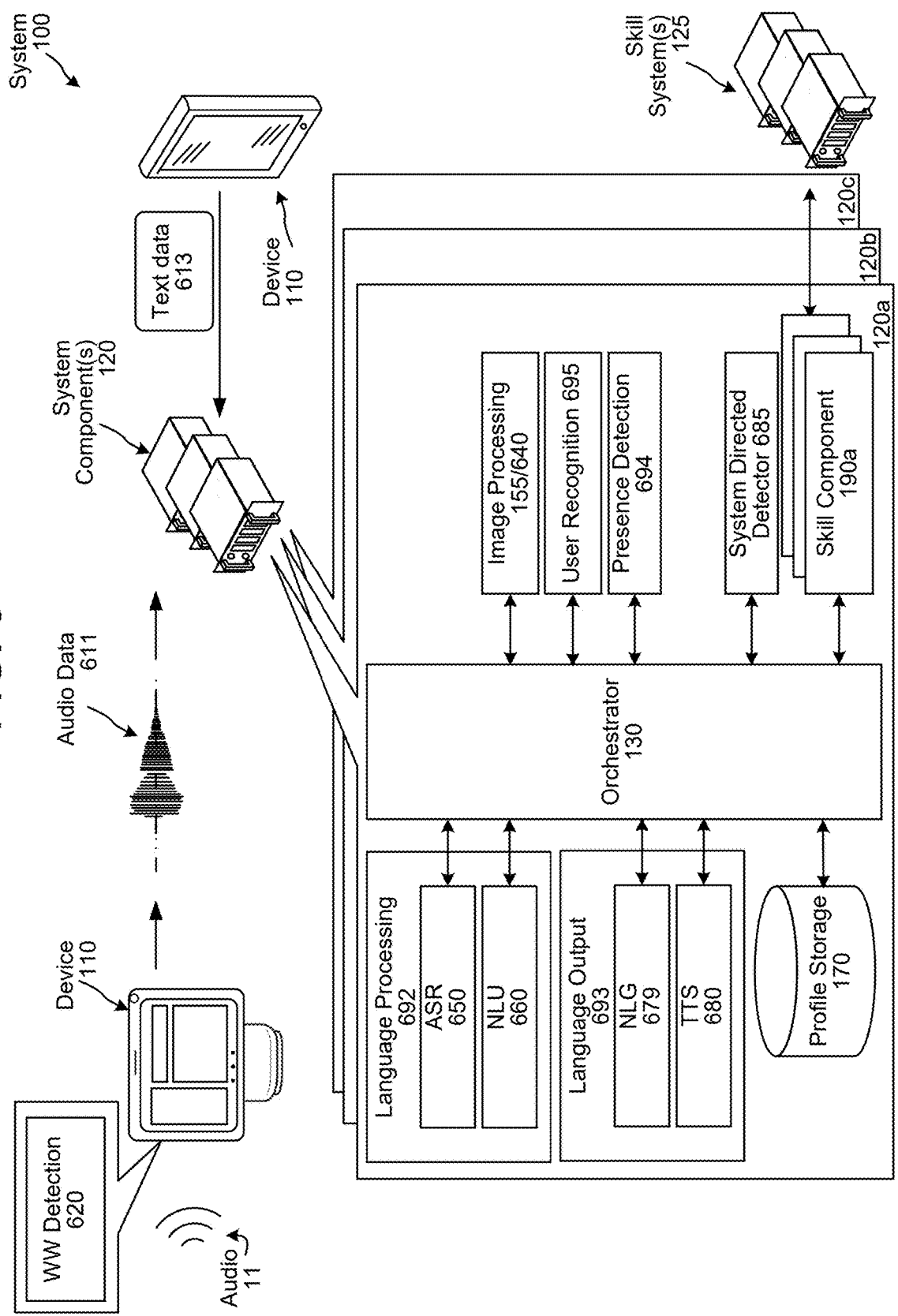
FIG. 6 is a conceptual diagram of components of the system, according to embodiments of the present disclosure.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s) 120. In at least some embodiments, such determination may be made using a wakeword detection component 620. The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc.

The wakeword detector 620 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 620 and/or input is detected by an input detector, the device 110 may "wake" and begin transmitting audio data 611, representing the audio 11, to the system component(s) 120. The audio data 611 may include data corresponding to the wakeword; in other embodiments, the portion of the audio corresponding to the wakeword is removed by the device 110 prior to sending the audio data 611 to the system component(s) 120. In the case of touch input detection or gesture based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detector 620 may result in sending audio data to system component 120a for processing while detection of the wakeword "Computer" by the wakeword detector may result in sending audio data to system component 120b for processing. The system may have a separate wakeword and system for different skills/systems (e.g., "Dungeon Master" for a game play skill/system component 120c) and/or such skills/systems may be coordinated by one or more skill(s) 190 of one or more system components 120.

The device 110 may also include a system directed input detector 785. (The system component(s) 120 may also include a system directed input detector 685 which may operate in a manner similar to system directed input detector 785.) The system directed input detector 785 may be configured to determine whether an input to the system (for example speech, a gesture, etc.) is directed to the system or not directed to the system (for example directed to another user, etc.). The system directed input detector 785 may work in conjunction with the wakeword detector 620. If the system directed input detector 785 determines an input is directed to the system, the device 110 may "wake" and begin sending captured data for further processing (for example, processing audio data using the language processing 692/792, processing captured image data using image processing component 640/155 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input, and may output a green indicator if a system directed input is detected. Other such configurations are possible. Further details regarding the system directed input detector 785 are included below with regard to FIG. 8.

Upon receipt by the system component(s) 120, the audio data 611 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 611 to a language processing component 692. The language processing component 692 (sometimes also referred to as a spoken language understanding (SLU) component) includes an automatic speech recognition (ASR) component 650 and a natural language understanding (NLU) component 660. The ASR component 650 may transcribe the audio data 611 into text data. The text data output by the ASR component 650 represents one or more than one (e.g., in the form of an N-best list) ASR hypotheses representing speech represented in the audio data 611. The ASR component 650 interprets the speech in the audio data 611 based on a similarity between the audio data 611 and pre-established language models. For example, the ASR component 650 may compare the audio data 611 with models for sounds (e.g., acoustic units such as phonemes, senons, phones, etc.) and sequences of sounds to identify words that match the sequence of sounds of the speech represented in the audio data 611. The ASR component 650 sends the text data generated thereby to an NLU component 660, via, in some embodiments, the orchestrator component 130. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein.

The speech processing system 692 may further include a NLU component 660. The NLU component 660 may receive the text data from the ASR component. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the device 110, the system component(s) 120, a skill component 190, a skill system(s) 125, etc.) to execute the intent. For example, if the text data corresponds to "play the $5^{th}$ Symphony by Beethoven," the NLU component 660 may determine an intent that the system output music and may identify "Beethoven" as an artist/composer and "5th Symphony" as the piece of music to be played. For further example, if the text data corresponds to "what is the weather," the NLU component 660 may determine an intent that the system output weather information associated with a geographic location of the device 110. In another example, if the text data corresponds to "turn off the lights," the NLU component 660 may determine an intent that the system turn off lights associated with the device 110 or the user 5. However, if the NLU component 660 is unable to resolve the entity—for example, because the entity is referred to by anaphora such as "this song" or "my next appointment"—the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 660 may return NLU results data (which may include tagged text data, indicators of intent, etc.) back to the orchestrator 130. The orchestrator 130 may forward the NLU results data to a skill component(s) 190. If the NLU results data includes a single NLU hypothesis, the NLU component 660 and the orchestrator component 130 may direct the NLU results data to the skill component(s) 190 associated with the NLU hypothesis. If the NLU results data includes an N-best list of NLU hypotheses, the NLU component 660 and the orchestrator component 130 may direct the top scoring NLU hypothesis to a skill component(s) 190 associated with the top scoring NLU hypothesis. The system may also include a post-NLU ranker (not shown) which may incorporate other information to rank potential interpretations determined by the NLU component 660. The local device 110 may also include its own post-NLU ranker (not shown), which may operate similarly to the post-NLU ranker of system component(s) 120.

A skill component may be software running on the system component(s) 120 that is akin to a software application. That is, a skill component 190 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 190. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 190 may operate in conjunction between the system component(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system component(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 190 dedicated to interacting with the skill support system(s) 125. Unless expressly stated otherwise, reference to a skill, skill device, or skill component may include a skill component 190 operated by the system component(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The system component(s) 120 includes a language output component 693. The language output component 693 includes a natural language generation (NLG) component 679 and a text-to-speech (TTS) component 680. The NLG component 679 can generate text for purposes of TTS output to a user. For example the NLG component 679 may generate text corresponding to instructions corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680 (e.g., output text data 1315 discussed below). Alternatively or in addition, the TTS component 680 may receive text data from a skill 190 or other system component for output.

The NLG component 679 may include a trained model. The NLG component 679 generates text data 1315 from dialog data such that the output text data 1315 has a natural feel and, in some embodiments, includes words and/or phrases specifically formatted for a requesting individual. The NLG may use templates to formulate responses. And/or the NLG system may include models trained from the various templates for forming the output text data 1315. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 680.

The TTS component 680 may generate audio data (e.g., synthesized speech) from text data using one or more different methods. Text data input to the TTS component 680 may come from a skill component 190, the orchestrator component 130, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 611 representing the commands to the system component(s) 120 for processing, after which the system component(s) 120 may return output data that can cause the device 110 to engage its camera.

The image processing component 640 can perform computer vision functions such as object recognition, modeling, reconstruction, etc. For example, the image processing component 640 may detect a person, face, etc. (which may then be identified using user recognition component 695). The image processing component 155/640 is described in greater detail below with regard to FIG. 9. The device may also include an image processing component 155 which operates similarly to image processing component 640.

In some implementations, the image processing component 640 can detect the presence of text in an image. In such implementations, the image processing component 640 can recognize the presence of text, convert the image data to text data, and send the resulting text data via the orchestrator component 130 to the language processing component 692 for processing by the NLU component 660.

Figure 10:
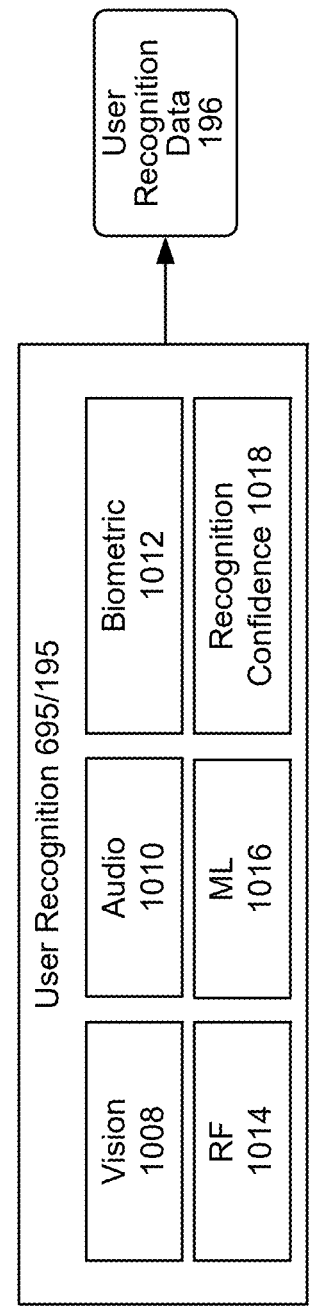
FIG. 10 is a schematic diagram of an illustrative architecture in which sensor data is combined to recognize one or more users according to embodiments of the present disclosure.

The system component(s) 120 may include a user recognition component 695 that recognizes one or more users using a variety of data, as described in greater detail below with regard to FIGS. 10-11. However, the disclosure is not limited thereto, and the device 110 may include a user recognition component 195 instead of and/or in addition to user recognition component 695 of the system component(s) 120 without departing from the disclosure. User recognition component 195 operates similarly to user recognition component 695.

The user-recognition component 695 may take as input the audio data 611 and/or text data output by the ASR component 650. The user-recognition component 695 may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component 695 may further perform user recognition by comparing image data (e.g., including a representation of at least a feature of a user), received by the system in correlation with the present user input, with stored image data including representations of features of different users. The user-recognition component 695 may perform additional user recognition processes, including those known in the art.

The user-recognition component 695 determines scores indicating whether user input originated from a particular user. For example, a first score may indicate a likelihood that the user input originated from a first user, a second score may indicate a likelihood that the user input originated from a second user, etc. The user-recognition component 695 also determines an overall confidence regarding the accuracy of user recognition operations.

Output of the user-recognition component 695 may include a single user identifier corresponding to the most likely user that originated the user input. Alternatively, output of the user-recognition component 695 may include an N-best list of user identifiers with respective scores indicating likelihoods of respective users originating the user input. The output of the user-recognition component 695 may be used to inform NLU processing as well as processing performed by other components of the system.

The system component(s) 120/device 110 may include a presence detection component 694/194 that determines the presence and/or location of one or more users using a variety of data, as described in greater detail below with regard to FIG. 12.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 170 may include one or more user profiles, with each user profile being associated with a different user identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
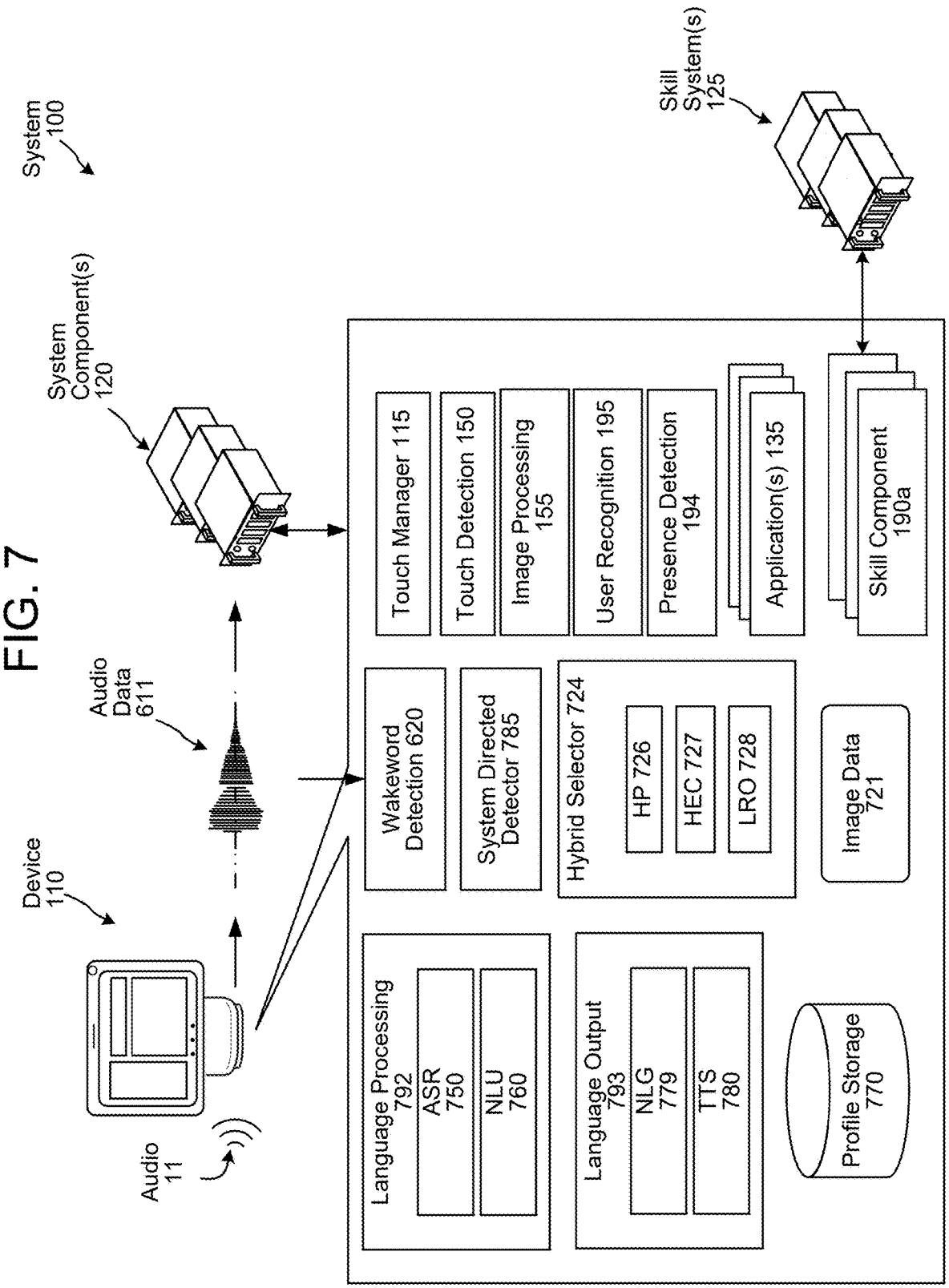
FIG. 7 is a conceptual diagram illustrating components that may be included in a device, according to embodiments of the present disclosure.

Although the components of FIG. 6 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure. FIG. 7 illustrates such a configured device 110.

In at least some embodiments, the system component(s) 120 may receive the audio data 611 from the device 110, to recognize speech corresponding to a spoken input in the received audio data 611, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 6, the device 110 may include a wakeword detection component 620 configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) 120 and/or the ASR component 750. The wakeword detection component 620 may also send an indication, to the hybrid selector 724, representing a wakeword was not detected. In response to receiving such an indication, the hybrid selector 724 may refrain from sending the audio data 611 to the system component(s) 120, and may prevent the ASR component 750 from further processing the audio data 611. In this situation, the audio data 611 can be discarded.

The device 110 may conduct its own speech processing using on-device language processing components, such as an SLU/language processing component 792 (which may include an ASR component 750 and an NLU 760), similar to the manner discussed herein with respect to the SLU component 692 (or ASR component 650 and the NLU component 660) of the system component(s) 120. Language processing component 792 may operate similarly to language processing component 692, ASR component 750 may operate similarly to ASR component 650 and NLU component 760 may operate similarly to NLU component 660. The device 110 may also internally include, or otherwise have access to, other components such as one or more skill components 790 capable of executing commands based on NLU output data or other results determined by the device 110/system component(s) 120 (which may operate similarly to skill components 190), a user recognition component 195 (configured to process in a similar manner to that discussed herein with respect to the user recognition component 695 of the system component(s) 120), profile storage 770 (configured to store similar profile data to that discussed herein with respect to the profile storage 170 of the system component(s) 120), or other components. In at least some embodiments, the profile storage 770 may only store profile data for a user or group of users specifically associated with the device 110. Similar to as described above with respect to skill component 190, a skill component 790 may communicate with a skill system(s) 125. The device 110 may also have its own language output component 793 which may include NLG component 779 and TTS component 780. Language output component 793 may operate similarly to language processing component 693, NLG component 779 may operate similarly to NLG component 679 and TTS component 780 may operate similarly to TTS component 680.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 724, of the device 110, may include a hybrid proxy (HP) 726 configured to proxy traffic to/from the system component(s) 120. For example, the HP 726 may be configured to send messages to/from a hybrid execution controller (HEC) 727 of the hybrid selector 724. For example, command/directive data received from the system component(s) 120 can be sent to the HEC 727 using the HP 726. The HP 726 may also be configured to allow the audio data 611 to pass to the system component(s) 120 while also receiving (e.g., intercepting) this audio data 611 and sending the audio data 611 to the HEC 727.

In at least some embodiments, the hybrid selector 724 may further include a local request orchestrator (LRO) 728 configured to notify the ASR component 750 about the availability of new audio data 611 that represents user speech, and to otherwise initiate the operations of local language processing when new audio data 611 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 611 is received, the HP 726 may allow the audio data 611 to pass through to the system component(s) 120 and the HP 726 may also input the audio data 611 to the on-device ASR component 750 by routing the audio data 611 through the HEC 727 of the hybrid selector 724, whereby the LRO 728 notifies the ASR component 750 of the audio data 611. At this point, the hybrid selector 724 may wait for response data from either or both of the system component(s) 120 or the local language processing components. However, the disclosure is not limited thereto, and in some examples the hybrid selector 724 may send the audio data 611 only to the local ASR component 750 without departing from the disclosure. For example, the device 110 may process the audio data 611 locally without sending the audio data 611 to the system component(s) 120.

The local ASR component 750 is configured to receive the audio data 611 from the hybrid selector 724, and to recognize speech in the audio data 611, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 660 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 5.

The device 110 and/or the system component(s) 120 may associate a unique identifier with each natural language user input. The device 110 may include the unique identifier when sending the audio data 611 to the system component(s) 120, and the response data from the system component(s) 120 may include the unique identifier to identify which natural language user input the response data corresponds.

In at least some embodiments, the device 110 may include, or be configured to use, one or more skill components 790 that may work similarly to the skill component(s) 190 implemented by the system component(s) 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 790, a skill system 125, or a combination of a skill component 790 and a corresponding skill system 125.

Similar to the manner discussed with regard to FIG. 6, the local device 110 may be configured to recognize multiple different wakewords and/or perform different categories of tasks depending on the wakeword. Such different wakewords may invoke different processing components of local device 110 (not illustrated in FIG. 7). For example, detection of the wakeword "Alexa" by the wakeword detector 620 may result in sending audio data to certain language processing components 792/skills 790 for processing while detection of the wakeword "Computer" by the wakeword detector may result in sending audio data different language processing components 792/skills 790 for processing.

Figure 8:
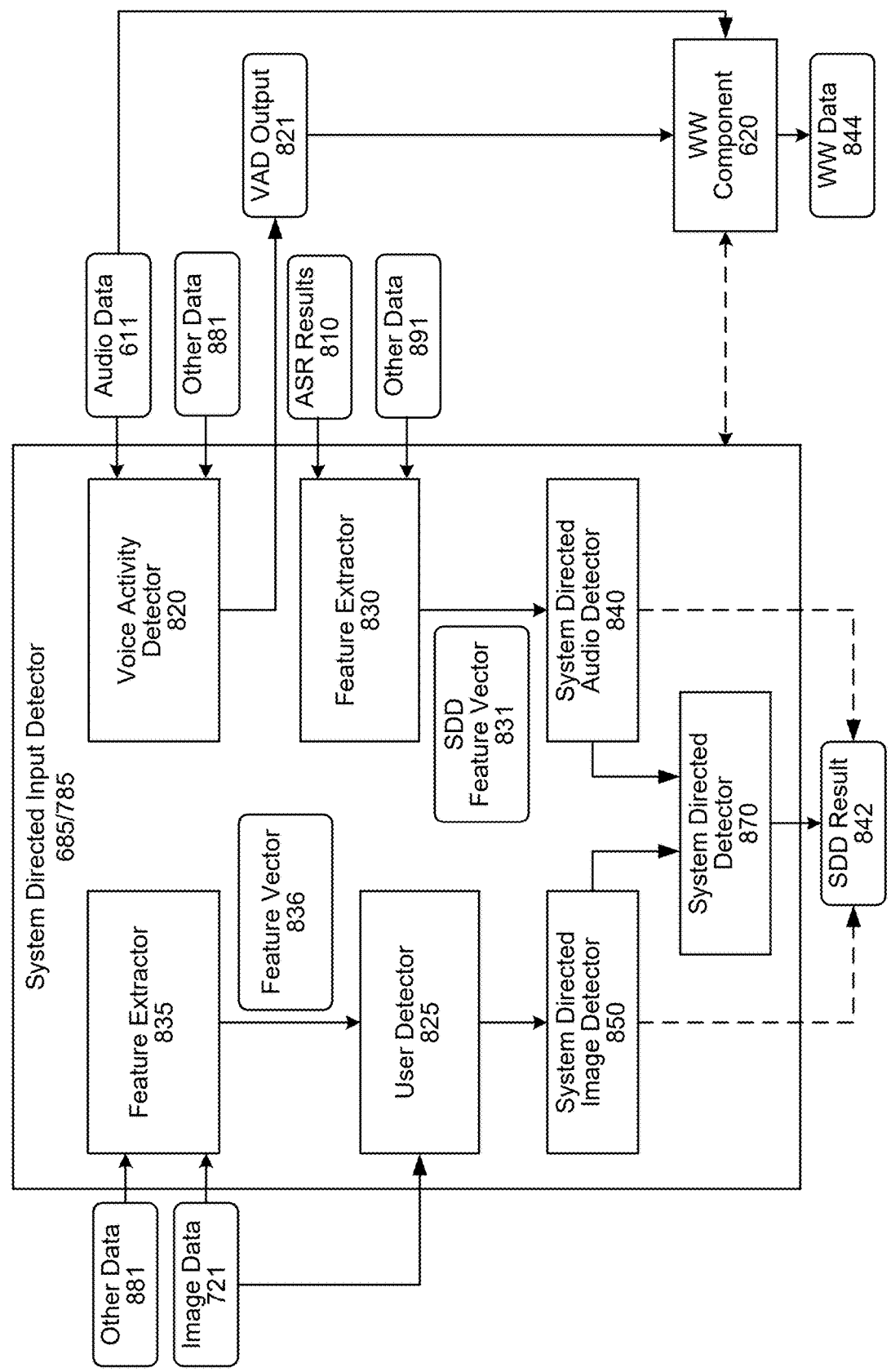
FIG. 8 is a conceptual diagram of components of a system to detect if input audio data includes system directed speech, according to embodiments of the present disclosure.

Configuration and operation of the system directed input detector 785 is illustrated in FIG. 8. As shown in FIG. 8, the system directed input detector 785 may include a number of different components. First, the system directed input detector 785 may include a voice activity detector (VAD) 820. The VAD 820 may operate to detect whether the incoming audio data 611 includes speech or not. The VAD output 821 may be a binary indicator. Thus, if the incoming audio data 611 includes speech, the VAD 820 may output an indicator 821 that the audio data 611 does includes speech (e.g., a 1) and if the incoming audio data 611 does not includes speech, the VAD 820 may output an indicator 821 that the audio data 611 does not includes speech (e.g., a 0). The VAD output 821 may also be a score (e.g., a number between 0 and 1) corresponding to a likelihood that the audio data 611 includes speech. The VAD 820 may also perform start-point detection as well as end-point detection where the VAD 820 determines when speech starts in the audio data 611 and when it ends in the audio data 611. Thus the VAD output 821 may also include indicators of a speech start point and/or a speech endpoint for use by other components of the system. (For example, the start-point and end-points may demarcate the audio data 611 that is sent to the language processing component 692.) The VAD output 821 may be associated with a same unique ID as the audio data 611 for purposes of tracking system processing across various components.

The VAD 820 may operate using a variety of VAD techniques, including those described above with regard to VAD operations performed by device 110. The VAD may be configured to be robust to background noise so as to accurately detect when audio data actually includes speech or not. The VAD 820 may operate on raw audio data 611 such as that sent by device 110 or may operate on feature vectors or other data representing the audio data 611. For example, the VAD 820 may take the form of a deep neural network (DNN) and may operate on a single feature vector representing the entirety of audio data 611 received from the device or may operate on multiple feature vectors, for example feature vectors representing frames of audio data where each frame covers a certain amount of time of audio data (e.g., 25 ms). The VAD 820 may also operate on other data 881 that may be useful in detecting voice activity in the audio data 611. For example, the other data 881 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 611 to determine if that voice matches a voice in the reference section of speech. If the voices match, that may be an indicator to the VAD 820 that speech was detected. If not, that may be an indicator to the VAD 820 that speech was not detected. (For example, a representation may be taken of voice data in the first input audio data which may then be compared to the second input audio data to see if the voices match. If they do (or do not) that information may be considered by the VAD 820.) The VAD 820 may also consider other data when determining if speech was detected. The VAD 820 may also consider speaker ID information (such as may be output by user recognition component 695), directionality data that may indicate what direction (relative to the capture device 110) the incoming audio was received from. Such directionality data may be received from the device 110 and may have been determined by a beamformer or other component of device 110. The VAD 820 may also consider data regarding a previous utterance which may indicate whether the further audio data received by the system is likely to include speech. Other VAD techniques may also be used.

If the VAD output 821 indicates that no speech was detected the system (through orchestrator 130 or some other component) may discontinue processing with regard to the audio data 611, thus saving computing resources that might otherwise have been spent on other processes (e.g., ASR for the audio data 611, etc.). If the VAD output 821 indicates that speech was detected, the system may make a determination as to whether the speech was or was not directed to the speech-processing system. Such a determination may be made by the system directed audio detector 840. The system directed audio detector 840 may include a trained model, such as a DNN, that operates on a feature vector which represent certain data that may be useful in determining whether or not speech is directed to the system. To create the feature vector operable by the system directed audio detector 840, a feature extractor 830 may be used. The feature extractor 830 may input ASR results 810 which include results from the processing of the audio data 611 by the speech recognition component 750. For privacy protection purposes, in certain configurations the ASR results 810 may be obtained from a language processing component 792/ASR component 750 located on device 110 or on a home remote component as opposed to a language processing component 692/ASR component 650 located on a cloud or other remote system component(s) 120 so that audio data 611 is not sent remote from the user's home unless the system directed input detector component 785 has determined that the input is system directed. Though this may be adjusted depending on user preferences/system configuration.

The ASR results 810 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 810 may include a trellis, which may include a raw search graph as scored during ASR decoding. The ASR results 810 may also include a lattice, which may be a trellis as scored that has been pruned to remove certain hypotheses that do not exceed a score threshold or number of hypotheses threshold. The ASR results 810 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 810 may also include corresponding respective scores (such as for a trellis, lattice, confusion network, individual hypothesis, N-best list, etc.)

The ASR results 810 (or other data 891) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 750 being less confident about its best hypothesis, which in turn may correlate to detected speech not being device directed. The entropy may be a feature included in other data 891 to be considered by the system directed audio detector 840.

The system may also determine and consider ASR decoding costs, which may include features from Viterbi decoding costs of the ASR. Such features may indicate how well the input acoustics and vocabulary match with the acoustic models and language models. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 750 is less confident about the top hypothesis, which may correlate to detected speech not being device directed. Other such features or data from the ASR results 810 may also be used as other data 891.

The ASR results 810 may be represented in a system directed detector (SDD) feature vector 831 that can be used to determine whether speech was system-directed. The feature vector 831 may represent the ASR results 810 but may also represent audio data 611 (which may be input to feature extractor 830) or other information. Such ASR results may be helpful in determining if speech was system-directed. For example, if ASR results include a high scoring single hypothesis, that may indicate that the speech represented in the audio data 611 is directed at, and intended for, the device 110. If, however, ASR results do not include a single high scoring hypothesis, but rather many lower scoring hypotheses, that may indicate some confusion on the part of the speech recognition component 750 and may also indicate that the speech represented in the audio data 611 was not directed at, nor intended for, the device 110.

The ASR results 810 may include complete ASR results, for example ASR results corresponding to all speech between a startpoint and endpoint (such as a complete lattice, etc.). In this configuration the system may wait until all ASR processing for a certain input audio has been completed before operating the feature extractor 830 and system directed audio detector 840. Thus the system directed audio detector 840 may receive a feature vector 831 that includes all the representations of the audio data 611 created by the feature extractor 830. The system directed audio detector 840 may then operate a trained model (such as a DNN) on the feature vector 831 to determine a score corresponding to a likelihood that the audio data 611 includes a representation of system-directed speech. If the score is above a threshold, the system directed audio detector 840 may determine that the audio data 611 does include a representation of system-directed speech. The SDD result 842 may include an indicator of whether the audio data includes system-directed speech, a score, and/or some other data.

The ASR results 810 may also include incomplete ASR results, for example ASR results corresponding to only some speech between a between a startpoint and endpoint (such as an incomplete lattice, etc.). In this configuration the feature extractor 830/system directed audio detector 840 may be configured to operate on incomplete ASR results 810 and thus the system directed audio detector 840 may be configured to output an SSD result 842 that provides an indication as to whether the portion of audio data processed (that corresponds to the incomplete ASR results) corresponds to system directed speech. The system may thus be configured to perform ASR at least partially in parallel with the system directed audio detector 840 to process ASR result data as it is ready and thus continually update an SDD result 842.

Once the system directed input detector 785 has processed enough ASR results and/or the SDD result 842 exceeds a threshold, the system may determine that the audio data 611 includes system-directed speech. Similarly, once the system directed input detector 785 has processed enough ASR results and/or the SDD result 842 drops below another threshold, the system may determine that the audio data 611 does not include system-directed speech.

The SDD result 842 may be associated with a same unique ID as the audio data 611 and VAD output 821 for purposes of tracking system processing across various components.

The feature extractor 830 may also incorporate in a feature vector 831 representations of other data 891. Other data 891 may include, for example, word embeddings from words output by the speech recognition component 750 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 830 processing and representing a word embedding in a feature vector 831 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 891 may also include, for example, NLU output from an natural language component may be considered. Thus, if natural language output data indicates a high correlation between the audio data 611 and an out-of-domain indication, this may indicate that the audio data 611 does not include system-directed speech. Other data 891 may also include, for example, an indicator of a user/speaker as output user recognition component 695. Thus, for example, if the user recognition component 695 does not indicate the presence of a known user, or indicates the presence of a user associated with audio data 611 that was not associated with a previous utterance, this may indicate that the audio data 611 does not include system-directed speech. The other data 891 may also include an indication that a voice represented in audio data 611 is the same (or different) as the voice detected in previous input audio data corresponding to a previous utterance. The other data 891 may also include directionality data, for example using beamforming or other audio processing techniques to determine a direction/location of a source of detected speech and whether that source direction/location matches a speaking user. The other data 891 may also include data indicating that a direction of a user's speech is toward a device 110 or away from a device 110, which may indicate whether the speech was system directed or not.

Other data 891 may also include image data 721. For example, if image data is detected from one or more devices that are nearby to the device 110 (which may include the device 110 itself) that captured the audio data being processed using the system directed input detector (785), the image data may be processed to determine whether a user is facing an audio capture device for purposes of determining whether speech is system-directed as further explained below.

Other data 891 may also dialog history data. For example, the other data 891 may include information about whether a speaker has changed from a previous utterance to the current audio data 611, whether a topic of conversation has changed from a previous utterance to the current audio data, how NLU results from a previous utterance compare to NLU results obtained using the current audio data 611, other system context information. The other data 891 may also include an indicator as to whether the audio data 611 was received as a result of a wake command or whether the audio data 611 was sent without the device 110 detecting a wake command (e.g., the device 110 being instructed by remote system component(s) 120 and/or determining to send the audio data without first detecting a wake command).

Other data 891 may also include information from the user profile storage 170.

Other data 891 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 891 may also include acoustic feature data such as pitch, prosody, intonation, volume, or other data descriptive of the speech in the audio data 611. As a user may use a different vocal tone to speak with a machine than with another human, acoustic feature information may be useful in determining if speech is device-directed.

Other data 891 may also include an indicator that indicates whether the audio data 611 includes a wakeword. For example, if a device 110 detects a wakeword prior to sending the audio data 611 to the remote system component(s) 120, the device 110 may send along an indicator that the device 110 detected a wakeword in the audio data 611. In another example, the remote system component(s) 120 may include another component that processes incoming audio data 611 to determine if it includes a wakeword. If it does, the component may create an indicator indicating that the audio data 611 includes a wakeword. The indicator may then be included in other data 891 to be incorporated in the feature vector 831 and/or otherwise considered by the system directed audio detector 840.

Other data 891 may also include device history data such as information about previous operations related to the device 110 that sent the audio data 611. For example, the other data 891 may include information about a previous utterance that was just executed, where the utterance originated with the same device 110 as a current utterance and the previous utterance was within a certain time window of the current utterance. Device history data may be stored in a manner associated with the device identifier (which may also be included in other data 891), which may also be used to track other information about the device, such as device hardware, capability, location, etc.

The other data 881 used by the VAD 820 may include similar data and/or different data from the other data 891 used by the feature extractor 830. The other data 881/891 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 840 and/or the VAD 820) may be based on the data from the previous utterance. For example, a score threshold (for the system directed audio detector 840 and/or the VAD 820) may be based on acoustic data from a previous utterance.

The feature extractor 830 may output a single feature vector 831 for one utterance/instance of input audio data 611. The feature vector 831 may consistently be a fixed length, or may be a variable length vector depending on the relevant data available for particular audio data 611. Thus, the system directed audio detector 840 may output a single SDD result 842 per utterance/instance of input audio data 611. The SDD result 842 may be a binary indicator. Thus, if the incoming audio data 611 includes system-directed speech, the system directed audio detector 840 may output an indicator 842 that the audio data 611 does includes system-directed speech (e.g., a 1) and if the incoming audio data 611 does not includes system-directed speech, the system directed audio detector 840 may output an indicator 842 that the audio data 611 does not system-directed includes speech (e.g., a 0). The SDD result 842 may also be a score (e.g., a number between 0 and 1) corresponding to a likelihood that the audio data 611 includes system-directed speech. Although not illustrated in FIG. 8, the flow of data to and from the system directed input detector 785 may be managed by the orchestrator 130 or by one or more other components.

The trained model(s) of the system directed audio detector 840 may be trained on many different examples of SDD feature vectors that include both positive and negative training samples (e.g., samples that both represent system-directed speech and non-system directed speech) so that the DNN and/or other trained model of the system directed audio detector 840 may be capable of robustly detecting when speech is system-directed versus when speech is not system-directed.

A further input to the system directed input detector 785 may include output data from TTS component 680 to avoid synthesized speech output by the system being confused as system-directed speech spoken by a user. The output from the TTS component 680 may allow the system to ignore synthesized speech in its considerations of whether speech was system directed. The output from the TTS component 680 may also allow the system to determine whether a user captured utterance is responsive to the TTS output, thus improving system operation.

The system directed input detector 785 may also use echo return loss enhancement (ERLE) and/or acoustic echo cancellation (AEC) data to avoid processing of audio data generated by the system.

As shown in FIG. 8, the system directed input detector 785 may simply user audio data to determine whether an input is system directed (for example, system directed audio detector 840 may output an SDD result 842). This may be true particularly when no image data is available (for example for a device without a camera). If image data 721 is available, however, the system may also be configured to use image data 721 to determine if an input is system directed. The image data 721 may include image data captured by device 110 and/or image data captured by other device(s) in the environment of device 110. The audio data 611, image data 721 and other data 881 may be timestamped or otherwise correlated so that the system directed input detector 785 may determine that the data being analyzed all relates to a same time window so as to ensure alignment of data considered with regard to whether a particular input is system directed. For example, the system directed input detector 785 may determine system directedness scores for every frame of audio data/every image of a video stream and may align and/or window them to determine a single overall score for a particular input that corresponds to a group of audio frames/images.

Image data 721 along with other data 881 may be received by feature extractor 835. The feature extractor may create one or more feature vectors 836 which may represent the image data 721/other data 881. In certain examples, other data 881 may include data from image processing component 155 which may include information about faces, gesture, etc. detected in the image data 721. For privacy protection purposes, in certain configurations any image processing/results thereof may be obtained from an image processing component 155 located on device 110 or on a home remote component as opposed to a image processing component 640 located on a cloud or other remote system component(s) 120 so that image data 721 is not sent remote from the user's home unless the system directed input detector component 785 has determined that the input is system directed. Though this may be adjusted depending on user preferences/system configuration.

The feature vector 836 may be passed to the user detector 825. The user detector 825 (which may use various components/operations of image processing component 155, user recognition component 695, etc.) may be configured to process image data 721 and/or feature vector 836 to determine information about the user's behavior which in turn may be used to determine if an input is system directed. For example, the user detector 825 may be configured to determine the user's position/behavior with respect to device 110/system 100. The user detector 825 may also be configured to determine whether a user's mouth is opening/closing in a manner that suggests the user is speaking. The user detector 825 may also be configured to determine whether a user is nodding or shaking his/her head. The user detector 825 may also be configured to determine whether a user's gaze is directed to the device 110, to another user, or to another object. For example, the use detector 825 may include, or be configured to use data from, a gaze detector. The user detector 825 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 825 may also be configured to determine a user's position/orientation such as facing another user, facing the device 110, whether their back is turned, etc. The user detector 825 may also be configured to determine relative positions of multiple users that appear in image data (and/or are speaking in audio data 611 which may also be considered by the user detector 825 along with feature vector 831), for example which users are closer to a device 110 and which are farther away. The user detector 825 (and/or other component) may also be configured to identify other objects represented in image data and determine whether objects are relevant to a dialog or system interaction (for example determining if a user is referring to an object through a movement or speech).

The user detector 825 may operate one or more models (e.g., one or more classifiers) to determine if certain situations are represented in the image data 721. For example the user detector 825 may employ a visual directedness classifier that may determine, for each face detected in the image data 721 whether that face is looking at the device 110 or not. For example, a light-weight convolutional neural network (CNN) may be used which takes a face image cropped from the result of the face detector as input and output a [0,1] score of how likely the face is directed to the camera or not.

Another technique may include to determine a three-dimensional (3D) landmark of each face, estimate the 3D angle of the face and predict a directness score based on the 3D angle.

The user detector 825 (or other component(s) such as those in image processing 155) may be configured to track a face in image data to determine which faces represented may belong to a same person. The system may user IOU based tracker, a mean-shift based tracker, a particle filter based tracker or other technique.

The user detector 825 (or other component(s) such as those in user recognition component 695) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 850 may then determine, based on information from the user detector 825 as based on the image data whether an input relating to the image data is system directed. The system directed image detector 850 may also operate on other input data, for example image data including raw image data 721, image data including feature data 836 based on raw image data, other data 881, or other data. The determination by the system directed image detector 850 may result in a score indicating whether the input is system directed based on the image data. If no audio data is available, the indication may be output as SDD result 842. If audio data is available, the indication may be sent to system directed detector 870 which may consider information from both system directed audio detector 840 and system directed image detector 850. The system directed detector 870 may then process the data from both system directed audio detector 840 and system directed image detector 850 to come up with an overall determination as to whether an input was system directed, which may be output as SDD result 842. The system directed detector 870 may consider not only data output from system directed audio detector 840 and system directed image detector 850 but also other data/metadata corresponding to the input (for example, image data/feature data 836, audio data/feature data 831, image data 721, audio data 611, or the like discussed with regard to FIG. 8. The system directed detector 870 may include one or more models which may analyze the various input data to make a determination regarding SDD result 842.

In one example the determination of the system directed detector 870 may be based on "AND" logic, for example determining an input is system directed only if affirmative data is received from both system directed audio detector 840 and system directed image detector 850. In another example the determination of the system directed detector 870 may be based on "OR" logic, for example determining an input is system directed if affirmative data is received from either system directed audio detector 840 or system directed image detector 850. In another example the data received from system directed audio detector 840 and system directed image detector 850 are weighted individually based on other information available to system directed detector 870 to determine to what extend audio and/or image data should impact the decision of whether an input is system directed.

The system directed input detector 785 may also receive information from a wakeword component 620. For example, an indication that a wakeword was detected (e.g., WW data 844) may be considered by the system directed input detector 785 (e.g., by system directed audio detector 840, system directed detector 870, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 692). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 611 or image data 721) sent to a remote system component(s) 120 that is outside a user's home or other direct control.

Figure 9:
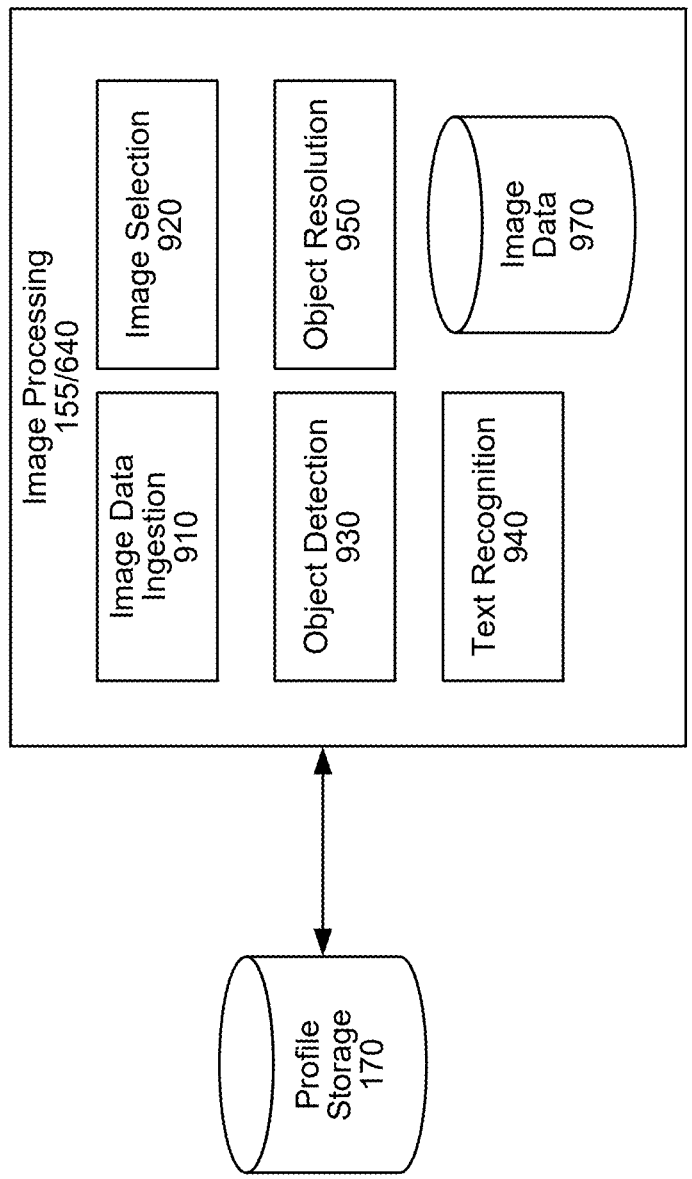
FIG. 9 is a conceptual diagram of components of an image processing component, according to embodiments of the present disclosure.

The device 110 may include image processing component 155. The system component(s) 120 may also include image processing component 640. Further components of such components are shown in FIG. 9 and discussed below. Unless otherwise noted, image processing component 155 may have similar capabilities as image processing component 640. For ease of illustration, the components are described as one unless otherwise noted. The image processing component 640 may located across different physical and/or virtual machines. The image processing component 640 may receive and analyze image data (which may include single images or a plurality of images such as in a video feed). The image processing component 640 may work with other components of the system component(s) 120 to perform various operations. For example the image processing component 640 may work with user recognition component 695 to assist with user recognition using image data. The image processing component 640 may also include or otherwise be associated with image data storage 970 which may store aspects of image data used by image processing component 640. The image data may be of different formats such as JPEG, GIF, BMP, MPEG, video formats, and the like.

Image matching algorithms, such as those used by image processing component 640, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 970, profile storage 170, or other storage component.

Image selection component 920 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 640 may be configured to select or discard an image quickly so that the system can, in turn, quickly process the selected image and deliver results to a user. The image selection component 920 may select an image for object recognition by computing a metric/feature for each frame in the video feed and selecting an image for processing if the metric exceeds a certain threshold. While FIG. 9 illustrates image selection component 920 as part of system component(s) 120, it may also be located on device 110 so that the device may select only desired image(s) to send to system component(s) 120, thus avoiding sending too much image data to system component(s) 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 920 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 920 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$candidate glyph area/(perimeter)$^2$), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$(candidate glyph number of pixels)/(perimeter)$^2$), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 920 for sending to another component (e.g., from device to system component(s) 120) and/or for further processing, such as text recognition, object detection/resolution, etc.

The feature data calculated by image selection component 920 may be sent to other components such as text recognition component 940, objection detection component 930, object resolution component 950, etc. so that those components may use the feature data in their operations. Other preprocessing operations such as masking, binarization, etc. may be performed on image data prior to recognition/resolution operations. Those preprocessing operations may be performed by the device prior to sending image data or by system component(s) 120.

Object detection component 930 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 930 may process at least a portion of the image data to determine feature data. The feature data is indicative of one or more features that are depicted in the image data. For example, the features may be face data, or other objects, for example as represented by stored data in profile storage 170. Other examples of features may include shapes of body parts or other such features that identify the presence of a human. Other examples of features may include edges of doors, shadows on the wall, texture on the walls, portions of artwork in the environment, and so forth to identify a space. The object detection component 930 may compare detected features to stored data (e.g., in profile storage 170, image data 970, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 930 the system may determine which object is actually seen using object resolution component 950. Thus one component, such as object detection component 930, may detect if an object is represented in an image while another component, object resolution component 950 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 930 may determine that a type of object is represented in image data and object resolution component 950 may then determine which specific object is represented. The object resolution component 950 may also make available specific data about a recognized object to further components so that further operations may be performed with regard to the resolved object.

Object detection component 930 may be configured to process image data to detect a representation of an approximately two-dimensional (2D) object (such as a piece of paper) or a three-dimensional (3D) object (such as a face). Such recognition may be based on available stored data (e.g., 170, 970, etc.) which in turn may have been provided through an image data ingestion process managed by image data ingestion component 910. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

The device 110 and/or the system component(s) 120 may include a user recognition component 695 that recognizes one or more users using a variety of data. As illustrated in FIG. 10, the user recognition component 695 may include one or more subcomponents including a vision component 1008, an audio component 1010, a biometric component 1012, a radio frequency (RF) component 1014, a machine learning (ML) component 1016, and a recognition confidence component 1018. In some instances, the user recognition component 695 may monitor data and determinations from one or more subcomponents to determine an identity of one or more users associated with data input to the device 110 and/or the system component(s) 120. The user recognition component 695 may output user recognition data 196, which may include a user identifier associated with a user the user recognition component 695 determines originated data input to the device 110 and/or the system component(s) 120. The user recognition data 196 may be used to inform processes performed by various components of the device 110 and/or the system component(s) 120.

The vision component 1008 may receive data from one or more sensors capable of providing images (e.g., cameras) or sensors indicating motion (e.g., motion sensors). The vision component 1008 can perform facial recognition or image analysis to determine an identity of a user and to associate that identity with a user profile associated with the user. In some instances, when a user is facing a camera, the vision component 1008 may perform facial recognition and identify the user with a high degree of confidence. In other instances, the vision component 1008 may have a low degree of confidence of an identity of a user, and the user recognition component 695 may utilize determinations from additional components to determine an identity of a user. The vision component 1008 can be used in conjunction with other components to determine an identity of a user. For example, the user recognition component 695 may use data from the vision component 1008 with data from the audio component 1010 to identify what user's face appears to be speaking at the same time audio is captured by a device 110 the user is facing for purposes of identifying a user who spoke an input to the device 110 and/or the system component(s) 120.

The overall system of the present disclosure may include biometric sensors that transmit data to the biometric component 1012. For example, the biometric component 1012 may receive data corresponding to fingerprints, iris or retina scans, thermal scans, weights of users, a size of a user, pressure (e.g., within floor sensors), etc., and may determine a biometric profile corresponding to a user. The biometric component 1012 may distinguish between a user and sound from a television, for example. Thus, the biometric component 1012 may incorporate biometric information into a confidence level for determining an identity of a user. Biometric information output by the biometric component 1012 can be associated with specific user profile data such that the biometric information uniquely identifies a user profile of a user.

The radio frequency (RF) component 1014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1014 the strength of the signal (e.g., as a received signal strength indication (RSSI)). The RF component 1014 may use the RSSI to determine an identity of a user (with an associated confidence level). In some instances, the RF component 1014 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1016 may track the behavior of various users as a factor in determining a confidence level of the identity of the user. By way of example, a user may adhere to a regular schedule such that the user is at a first location during the day (e.g., at work or at school). In this example, the ML component 1016 would factor in past behavior and/or trends in determining the identity of the user that provided input to the device 110 and/or the system component(s) 120. Thus, the ML component 1016 may use historical data and/or usage patterns over time to increase or decrease a confidence level of an identity of a user.

In at least some instances, the recognition confidence component 1018 receives determinations from the various components 1008, 1010, 1012, 1014, and 1016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 196.

The audio component 1010 may receive data from one or more sensors capable of providing an audio signal (e.g., one or more microphones) to facilitate recognition of a user. The audio component 1010 may perform audio recognition on an audio signal to determine an identity of the user and associated user identifier. In some instances, aspects of device 110 and/or the system component(s) 120 may be configured at a computing device (e.g., a local server). Thus, in some instances, the audio component 1010 operating on a computing device may analyze all sound to facilitate recognition of a user. In some instances, the audio component 1010 may perform voice recognition to determine an identity of a user.

The audio component 1010 may also perform user identification based on audio data 611 input into the device 110 and/or the system component(s) 120 for speech processing. The audio component 1010 may determine scores indicating whether speech in the audio data 611 originated from particular users. For example, a first score may indicate a likelihood that speech in the audio data 611 originated from a first user associated with a first user identifier, a second score may indicate a likelihood that speech in the audio data 611 originated from a second user associated with a second user identifier, etc. The audio component 1010 may perform user recognition by comparing speech characteristics represented in the audio data 611 to stored speech characteristics of users (e.g., stored voice profiles associated with the device 110 that captured the spoken user input).

Figure 11:
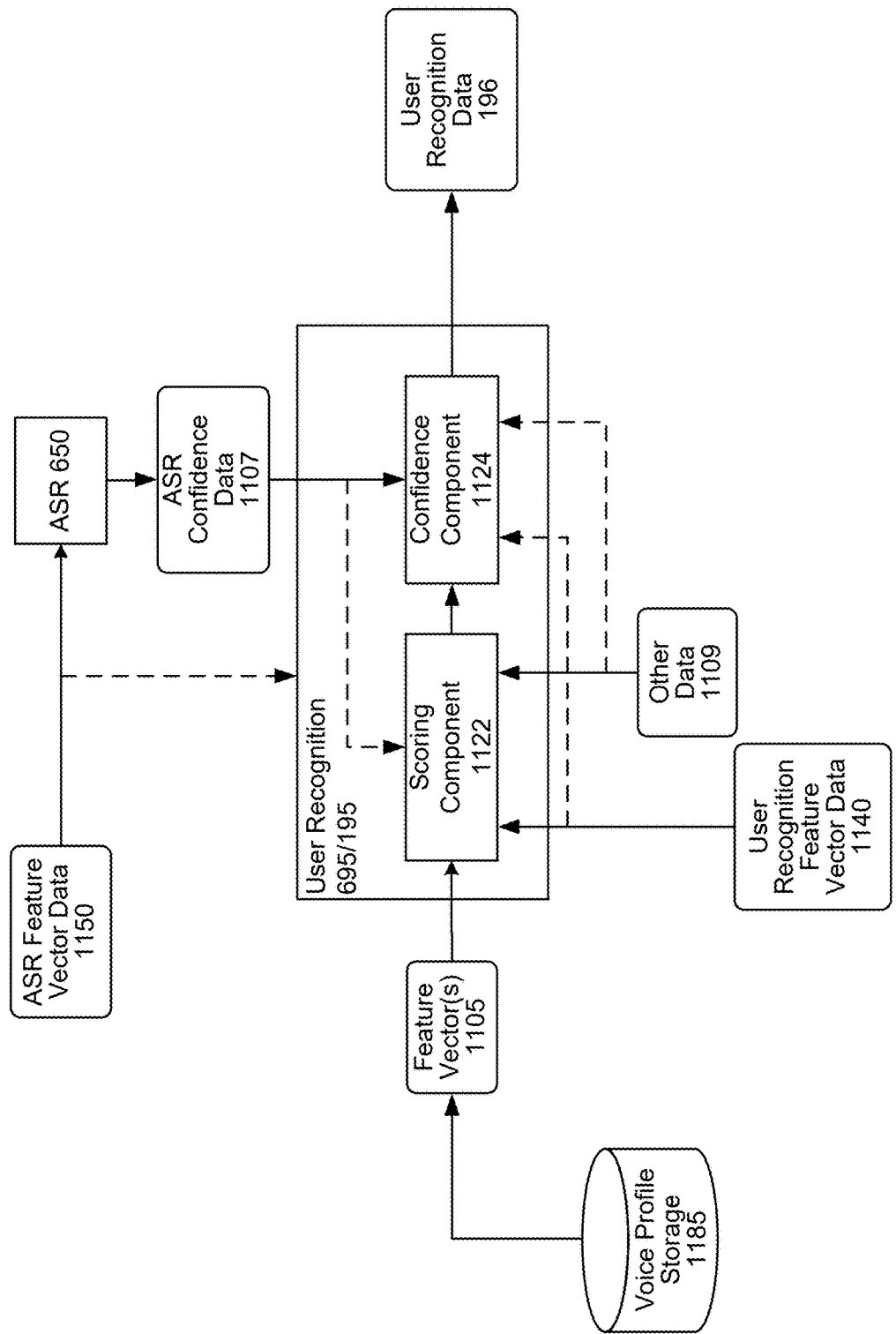
FIG. 11 is a system flow diagram illustrating user recognition according to embodiments of the present disclosure.

FIG. 11 illustrates user recognition processing as may be performed by the user recognition component 695. The ASR component 650 performs ASR processing on ASR feature vector data 1150. ASR confidence data 1107 may be passed to the user recognition component 695.

The user recognition component 695 performs user recognition using various data including the user recognition feature vector data 1140, feature vectors 1105 representing voice profiles of users of the system 100, the ASR confidence data 1107, and other data 1109. The user recognition component 695 may output the user recognition data 196, which reflects a certain confidence that the user input was spoken by one or more particular users. The user recognition data 196 may include one or more user identifiers (e.g., corresponding to one or more voice profiles). Each user identifier in the user recognition data 196 may be associated with a respective confidence value, representing a likelihood that the user input corresponds to the user identifier. A confidence value may be a numeric or binned value.

The feature vector(s) 1105 input to the user recognition component 695 may correspond to one or more voice profiles. The user recognition component 695 may use the feature vector(s) 1105 to compare against the user recognition feature vector 1140, representing the present user input, to determine whether the user recognition feature vector 1140 corresponds to one or more of the feature vectors 1105 of the voice profiles. Each feature vector 1105 may be the same size as the user recognition feature vector 1140.

To perform user recognition, the user recognition component 695 may determine the device 110 from which the audio data 611 originated. For example, the audio data 611 may be associated with metadata including a device identifier representing the device 110. Either the device 110 or the system component(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 1140 produced from the audio data 611. The user recognition component 695 may send a signal to voice profile storage 1185, with the signal requesting only audio data and/or feature vectors 1105 (depending on whether audio data and/or corresponding feature vectors are stored) associated with the device identifier, the group profile identifier, and/or the user identifiers represented in the metadata. This limits the universe of possible feature vectors 1105 the user recognition component 695 considers at runtime and thus decreases the amount of time to perform user recognition processing by decreasing the amount of feature vectors 1105 needed to be processed. Alternatively, the user recognition component 695 may access all (or some other subset of) the audio data and/or feature vectors 1105 available to the user recognition component 695. However, accessing all audio data and/or feature vectors 1105 will likely increase the amount of time needed to perform user recognition processing based on the magnitude of audio data and/or feature vectors 1105 to be processed.

If the user recognition component 695 receives audio data from the voice profile storage 1185, the user recognition component 695 may generate one or more feature vectors 1105 corresponding to the received audio data.

The user recognition component 695 may attempt to identify the user that spoke the speech represented in the audio data 611 by comparing the user recognition feature vector 1140 to the feature vector(s) 1105. The user recognition component 695 may include a scoring component 1122 that determines respective scores indicating whether the user input (represented by the user recognition feature vector 1140) was spoken by one or more particular users (represented by the feature vector(s) 1105). The user recognition component 695 may also include a confidence component 1124 that determines an overall accuracy of user recognition processing (such as those of the scoring component 1122) and/or an individual confidence value with respect to each user potentially identified by the scoring component 1122. The output from the scoring component 1122 may include a different confidence value for each received feature vector 1105. For example, the output may include a first confidence value for a first feature vector 1105a (representing a first voice profile), a second confidence value for a second feature vector 1105b (representing a second voice profile), etc. Although illustrated as two separate components, the scoring component 1122 and the confidence component 1124 may be combined into a single component or may be separated into more than two components.

The scoring component 1122 and the confidence component 1124 may implement one or more trained machine learning models (such as neural networks, classifiers, etc.) as known in the art. For example, the scoring component 1122 may use probabilistic linear discriminant analysis (PLDA) techniques. PLDA scoring determines how likely it is that the user recognition feature vector 1140 corresponds to a particular feature vector 1105. The PLDA scoring may generate a confidence value for each feature vector 1105 considered and may output a list of confidence values associated with respective user identifiers. The scoring component 1122 may also use other techniques, such as GMMs, generative Bayesian models, or the like, to determine confidence values.

The confidence component 1124 may input various data including information about the ASR confidence 1107, speech length (e.g., number of frames or other measured length of the user input), audio condition/quality data (such as signal-to-interference data or other metric data), fingerprint data, image data, or other factors to consider how confident the user recognition component 695 is with regard to the confidence values linking users to the user input. The confidence component 1124 may also consider the confidence values and associated identifiers output by the scoring component 1122. For example, the confidence component 1124 may determine that a lower ASR confidence 1107, or poor audio quality, or other factors, may result in a lower confidence of the user recognition component 695. Whereas a higher ASR confidence 1107, or better audio quality, or other factors, may result in a higher confidence of the user recognition component 695. Precise determination of the confidence may depend on configuration and training of the confidence component 1124 and the model(s) implemented thereby. The confidence component 1124 may operate using a number of different machine learning models/techniques such as GMM, neural networks, etc. For example, the confidence component 1124 may be a classifier configured to map a score output by the scoring component 1122 to a confidence value.

The user recognition component 695 may output user recognition data 196 specific to a one or more user identifiers. For example, the user recognition component 695 may output user recognition data 196 with respect to each received feature vector 1105. The user recognition data 196 may include numeric confidence values (e.g., 0.0-1.0, 0-1000, or whatever scale the system is configured to operate). Thus, the user recognition data 196 may output an n-best list of potential users with numeric confidence values (e.g., user identifier 123—0.2, user identifier 234—0.8). Alternatively or in addition, the user recognition data 196 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 695 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 196 may only include information related to the top scoring identifier as determined by the user recognition component 695. The user recognition component 695 may also output an overall confidence value that the individual confidence values are correct, where the overall confidence value indicates how confident the user recognition component 695 is in the output results. The confidence component 1124 may determine the overall confidence value.

The confidence component 1124 may determine differences between individual confidence values when determining the user recognition data 196. For example, if a difference between a first confidence value and a second confidence value is large, and the first confidence value is above a threshold confidence value, then the user recognition component 695 is able to recognize a first user (associated with the feature vector 1105 associated with the first confidence value) as the user that spoke the user input with a higher confidence than if the difference between the confidence values were smaller.

The user recognition component 695 may perform thresholding to avoid incorrect user recognition data 196 being output. For example, the user recognition component 695 may compare a confidence value output by the confidence component 1124 to a threshold confidence value. If the confidence value does not satisfy (e.g., does not meet or exceed) the threshold confidence value, the user recognition component 695 may not output user recognition data 196, or may only include in that data 196 an indicator that a user that spoke the user input could not be recognized. Further, the user recognition component 695 may not output user recognition data 196 until enough user recognition feature vector data 1140 is accumulated and processed to verify a user above a threshold confidence value. Thus, the user recognition component 695 may wait until a sufficient threshold quantity of audio data of the user input has been processed before outputting user recognition data 196. The quantity of received audio data may also be considered by the confidence component 1124.

The user recognition component 695 may be defaulted to output binned (e.g., low, medium, high) user recognition confidence values. However, such may be problematic in certain situations. For example, if the user recognition component 695 computes a single binned confidence value for multiple feature vectors 1105, the system may not be able to determine which particular user originated the user input. In this situation, the user recognition component 695 may override its default setting and output numeric confidence values. This enables the system to determine a user, associated with the highest numeric confidence value, originated the user input.

The user recognition component 695 may use other data 1109 to inform user recognition processing. A trained model(s) or other component of the user recognition component 695 may be trained to take other data 1109 as an input feature when performing user recognition processing. Other data 1109 may include a variety of data types depending on system configuration and may be made available from other sensors, devices, or storage. The other data 1109 may include a time of day at which the audio data 611 was generated by the device 110 or received from the device 110, a day of a week in which the audio data audio data 611 was generated by the device 110 or received from the device 110, etc.

The other data 1109 may include image data or video data. For example, facial recognition may be performed on image data or video data received from the device 110 from which the audio data 611 was received (or another device). Facial recognition may be performed by the user recognition component 695. The output of facial recognition processing may be used by the user recognition component 695. That is, facial recognition output data may be used in conjunction with the comparison of the user recognition feature vector 1140 and one or more feature vectors 1105 to perform more accurate user recognition processing.

The other data 1109 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1109 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 611 was received is a smart watch or vehicle belonging to a user A, the fact that the device 110 belongs to user A may increase a user recognition confidence value associated with user A and/or decrease a user recognition confidence value associated with user B.

The other data 1109 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 611. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1109 may include data representing activity of a particular user that may be useful in performing user recognition processing. For example, a user may have recently entered a code to disable a home security alarm. A device 110, represented in a group profile associated with the home, may have generated the audio data 611. The other data 1109 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1109 and considered by the user recognition component 695.

Depending on system configuration, the other data 1109 may be configured to be included in the user recognition feature vector data 1140 so that all the data relating to the user input to be processed by the scoring component 1122 may be included in a single feature vector. Alternatively, the other data 1109 may be reflected in one or more different data structures to be processed by the scoring component 1122.

A presence detection component 694/194 may determine the presence and/or location of one or more users using a variety of data. As illustrated in FIG. 12, the presence detection component 694/194 may include one or more components, similar to (but potentially separate from) those used in the user recognition component 1295, such as a vision component 1008, an audio component 1010, a biometric component 1012, a radio frequency component 1014, or the like. The presence detection component 694 may use these components to determine the presence of users within an environment. The presence detection component 694 may base its operation on sensor data detected by a variety of devices, for example devise such as those shown in FIG. 12 which may provide image data, audio data, RF data or even data from other sensors not expressly shown in FIG. 12 such as a RADAR sensor, LIDAR sensor, proximity sensor, etc.

Thus, in some instances, the presence detection component 694 may monitor data and determinations from one or more components to determine an identity of a user and/or a location of a user in an environment 1202. The presence detection component 694 may output user presence data 1295 which may indicate the presence of one or more users in an environment. The user presence data 1295 may also indicate a location of the user within the environment if the system has determined such information. The user presence data 1295 may also include a user identifier (e.g., user recognition data 196) matched with location information as to where the system believes the particular user of the user identifier is located. Such data may rely on processing by the user recognition component.

The location information may include geographic information (such as an address, city, state, country, geo-position (e.g., GPS coordinates), velocity, latitude, longitude, altitude, or the like). The location information may also include a device identifier, zone identifier or environment identifier corresponding to a device/zone/environment the particular user is nearby/within. Output of the presence detection component 694 may be used to inform natural language component 660 processes as well as processing performed by skills 190, routing of output data, permission access to further information, etc. The details of the vision component 1008, the audio component 1010, the biometric component 1012, the radio frequency component 1014, the machine learning component 1216, and the presence confidence component 1218 are provided below following a description of the environment 1202.

In some instances, the environment 1202 may represent a home or office associated with a user 1220 "Alice" and/or a user 1222 "Bob." In some instances, the user 1220 "Alice" may be associated with a computing device 1224, such as a smartphone. In some instances, the user 1222 "Bob" may be associated with a radio frequency device 1226, such as a wearable device (e.g., a smartwatch) or an identifier beacon.

The environment 1202 may include, but is not limited to, a number of devices that may be used to locate a user. For example, within zone 1201(1), the environment 1202 may include an imaging device 1228, an appliance 1230, a voice-controlled device 110*a*, and a computing device 1234. Within zone 1201(2), the environment 1202 may include a microphone 1236 and a motion sensor 1238. Within zone 1201(3), the environment may include an imaging device 1240, a television 1242, a speaker 1244, a set-top box 1246, a voice-controlled device 110*b*, a television 1250, and an access point 1252. Within zone 1201(4), the environment 1202 may include an appliance 1254, an imaging device 1256, a speaker 1258, a voice-controlled device 110*c*, and a microphone 1260.

Further, in some instances, the presence detection component 694 may have information regarding the layout of the environment 1202, include details regarding which devices are in which zones, the relationship between zones (e.g., which rooms are adjacent), and/or the placement of individual devices within each zone. In some instances, the presence detection component 694 can leverage knowledge of the relationships between zones and the devices within each zone to increase a confidence level of user identity and location as a user moves about the environment 1202. For example, in a case where the user 1222 is in zone 1201(3), and subsequently moves beyond a field of view of the imaging device 1240 into the zone 1201(2), the presence detection component 694 may infer a location and/or identity of the user to determine with a high confidence level (in combination with data from one or more other devices) that any motion detected by the motion sensor 1238 corresponds to movement by the user 1222.

In some instances, the vision component 1008 may receive data from one or more sensors capable of providing images (e.g., such as the imaging devices 1228, 1240, 1256 and the computing devices 1224 and 1234) or sensors indicating motion (e.g., such as the motion sensor 1238). In some instances, the vision component 1008 can perform facial recognition or image analysis to determine an identity of a user and to associate that identity with a user profile associated with the user. In some instances, when a user (e.g., the user 1222 "Bob") is facing the imaging device 1240, the vision component 1008 may perform facial recognition and identify the user 1222 with a high degree of confidence. In some instances, the vision component 1008 may have a low degree of confidence of an identity of a user, and the presence detection component 694 may utilize determinations from additional components to determine an identity and/or location of a user. In some instances, the vision component 1008 can be used in conjunction with other components to determine when a user is moving to a new location within the environment 1202. In some instances, the vision component 1008 can receive data from one or more imaging devices to determine a layout of a zone or room, and/or to determine which devices are in a zone and where they are located. In some instances, data from the vision component 1008 may be used with data from the audio component 1010 to identify what face appears to be speaking at the same time audio is captured by a particular device the user is facing for purposes of identifying a user who spoke an utterance.

In some instances, the environment 1202 may include biometric sensors that may transmit data to the biometric component 1012. For example, the biometric component 1012 may receive data corresponding to fingerprints, iris or retina scans, thermal scans, weights of users, a size of a user, pressure (e.g., within floor sensors), etc., and may determine a biometric profile corresponding to a user. In some instances, the biometric component 1012 may distinguish between a user and sound from a television, for example. Thus, the biometric component 1012 may incorporate biometric information into a confidence level for determining an identity and/or location of a user. In some instances, the biometric information from the biometric component 1012 can be associated with a specific user profile such that the biometric information uniquely identifies a user profile of a user (for example in conjunction with user recognition component 695).

In some instances, the radio frequency (RF) component 1014 may use RF localization to track devices that a user may carry or wear. For example, as discussed above, the user 1220 (and a user profile associated with the user) may be associated with a computing device 1224. The computing device 1224 may emit RF signals (e.g., Wi-Fi, Bluetooth®, etc.), which are illustrated as signals 1262 and 1264. As illustrated, the appliance 1254 may detect the signal 1262 and the access point 1252 may detect the signal 1264. In some instances, the access point 1252 and the appliance 1254 may indicate to the RF component 1014 the strength of the signals 1264 and 1262 (e.g., as a received signal strength indication (RSSI)), respectively. Thus, the RF component 1014 may compare the RSSI for various signals and for various appliances and may determine an identity and/or location of a user (with an associated confidence level). In some instances, the RF component 1014 may determine that a received RF signal is associated with a mobile device that is associated with a particular user. In some instances, a device (e.g., the access point 1252) may be configured with multiple antennas to determine a location of a user relative to the device using beamforming or spatial diversity techniques. In such a case, the RF component 1014 may receive an indication of the direction of the user relative to an individual device.

As illustrated, the appliance 1230 may receive a signal 1266 from the RF device 1226 associated with the user and a user profile, while the access point 1252 may receive a signal 1268. Further, the appliance 1254 can receive a signal 1270 from the RF device 1226. In an example where there is some uncertainty about an identity of the users in zones 1201(3) and 1201(4), the RF component 1014 may determine that the RSSI of the signals 1262, 1264, 1266, 1268, and/or 1270 increases or decreases a confidence level of an identity and/or location of the users, such as the user 1220 and 1222. For example, if an RSSI of the signal 1262 is higher than the RSSI of the signal 1270, the RF component may determine that it is more likely that a user in the zone 1201(4) is the user 1220 than the user 1222. In some instances, a confidence level of the determination may depend on a relative difference of the RSSIs, for example.

In some instances a voice controlled device 110, or another device proximate to the voice controlled device 110 may include some RF or other detection processing capabilities so that a user who speaks an utterance may scan, tap, or otherwise acknowledge his/her personal device (such as a phone) to a sensing device in the environment 1202. In this manner the user may "register" with the system for purposes of the system determining who spoke a particular utterance. Such a registration may occur prior to, during, or after speaking of an utterance.

In some instances, the audio component 1010 may receive data from one or more sensors capable of providing an audio signal (e.g., the voice-controlled devices 110*a-c*, the microphones 1236 and 1260, the computing devices 1224 and 1234, the set-top box 1246) to facilitate locating a user. In some instances, the audio component 1010 may perform audio recognition on an audio signal to determine an identity of the user and an associated user profile. Further, in some instances, the imaging devices 1228, 1240, and 1256 may provide an audio signal to the audio component 1010. In some instances, the audio component 1010 is configured to receive an audio signal from one or more devices and may determine a sound level or volume of the source of the audio. In some instances, if multiple sources of audio are available, the audio component 1010 may determine that two audio signals correspond to the same source of sound, and may compare the relative amplitudes or volumes of the audio signal to determine a location of the source of sound. In some instances, individual devices may include multiple microphone and may determine a direction of a user with respect to an individual device. In some instances, aspects of the server 120 may be configured at a computing device (e.g., a local server) within the environment 1202. Thus, in some instances, the audio component 1010 operating on a computing device in the environment 1202 may analyze all sound within the environment 1202 (e.g., without requiring a wake word) to facilitate locating a user.

Figure 13:
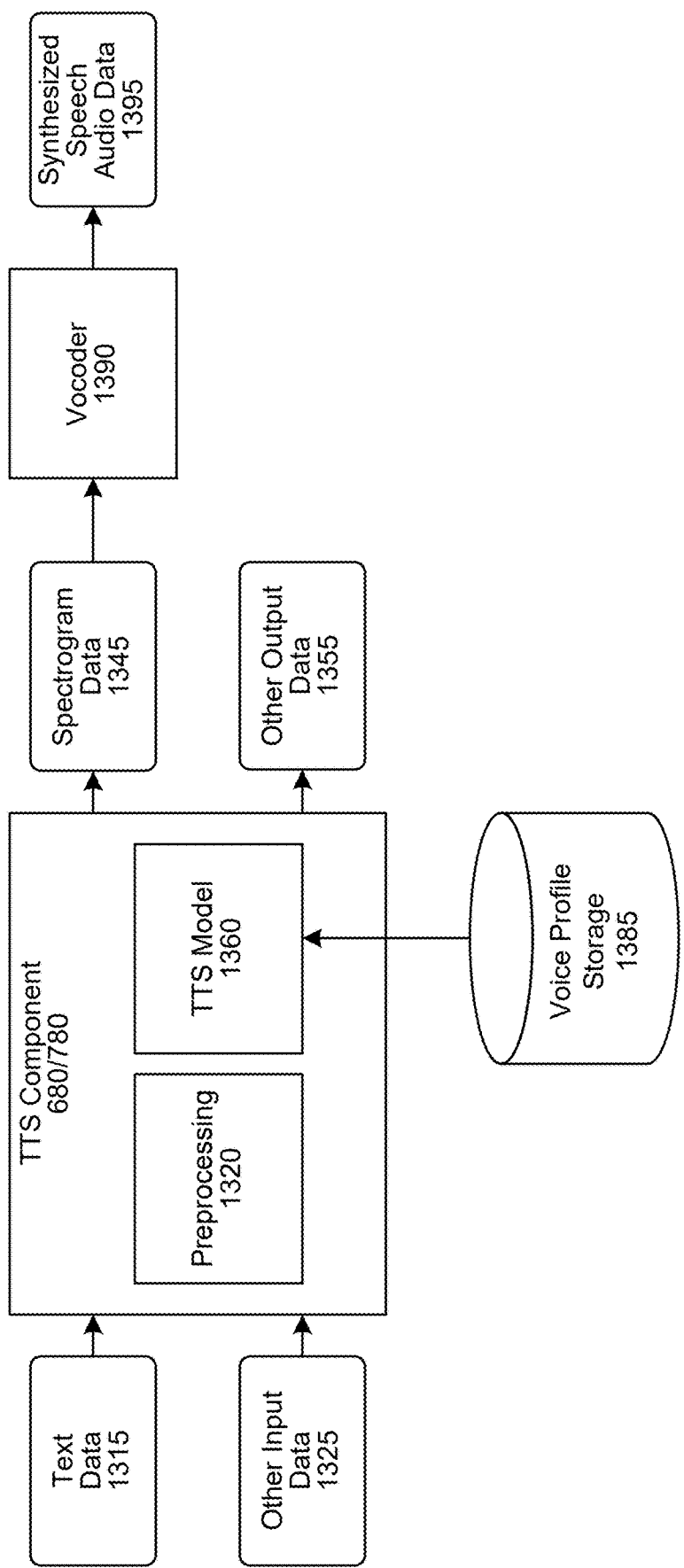
FIG. 13 is a conceptual diagram of text-to-speech components according to embodiments of the present disclosure.

Components of a system that may be used to perform unit selection, parametric TTS processing, and/or model-based audio synthesis are shown in FIG. 13. FIG. 13 is a conceptual diagram that illustrates operations for generating synthesized speech using a TTS component 680/780, according to embodiments of the present disclosure. The TTS component 680/780 may receive text data 1315 and process it using one or more TTS models 1360 to generate synthesized speech in the form of spectrogram data 1345. A vocoder 1390 may convert the spectrogram data 1345 into output speech audio data 1395, which may represent a time-domain waveform suitable for amplification and output as audio (e.g., from a loudspeaker).

The TTS component 680/780 may additionally receive other input data 1325. The other input data 1325 may include, for example, identifiers and/or labels corresponding to a desired speaker identity, voice characteristics, emotion, speech style, etc. desired for the synthesized speech. In some implementations, the other input data 1325 may include text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1315 and/or the other input data 1325 such as metadata accompanying a TTS request and indicating what text should be whispered (or have some other indicated audio characteristic).

The TTS component 680/780 may include a preprocessing component 1320 that can convert the text data 1315 and/or other input data 1325 into a form suitable for processing by the TTS model 1360. The text data 1315 may be from, for example an application, a skill component (described further below), an NLG component, another device or source, or may be input by a user. The text data 1315 received by the TTS component 680/780 may not necessarily be text, but may include other data (such as symbols, code, other data, etc.) that may reference text (such as an indicator of a word and/or phoneme) that is to be synthesized. The preprocessing component 1320 may transform the text data 1315 into, for example, a symbolic linguistic representation, which may include linguistic context features such as phoneme data, punctuation data, syllable-level features, word-level features, and/or emotion, speaker, accent, or other features for processing by the TTS component 680/780. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1315, such as surprise, anger, or fear. The speaker features may include data corresponding to a type of speaker, such as sex, age, or profession. The accent features may include data corresponding to an accent associated with the speaker, such as Southern, Boston, English, French, or other such accent. Style features may include a book reading style, poem reading style, a news anchor style, a sports commentator style, various singing styles, etc.

The preprocessing component 1320 may include functionality and/or components for performing text normalization, linguistic analysis, linguistic prosody generation, or other such operations. During text normalization, the preprocessing component 1320 may first process the text data 1315 and generate standard text, converting such things as numbers, abbreviations (such as Apt., St., etc.), symbols ($, %, etc.) into the equivalent of written out words.

During linguistic analysis, the preprocessing component 1320 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. In some implementations, the TTS model 1360 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in a storage component. The linguistic analysis performed by the preprocessing component 1320 may also identify different grammatical components such as prefixes, suffixes, phrases, punctuation, syntactic boundaries, or the like. Such grammatical components may be used by the TTS component 680/780 to craft a natural-sounding audio waveform output. The language dictionary may also include letter-to-sound rules and other tools that may be used to pronounce previously unidentified words or letter combinations that may be encountered by the TTS component 680/780. Generally, the more information included in the language dictionary, the higher quality the speech output.

The output of the preprocessing component 1320 may be a symbolic linguistic representation, which may include a sequence of phonetic units. In some implementations, the sequence of phonetic units may be annotated with prosodic characteristics. In some implementations, prosody may be applied in part or wholly by a TTS model 1360. This symbolic linguistic representation may be sent to the TTS model 1360 for conversion into audio data (e.g., in the form of Mel-spectrograms or other frequency content data format).

The TTS component 680/780 may retrieve one or more previously trained and/or configured TTS models 1360 from the voice profile storage 1385. A TTS model 1360 may be, for example, a neural network architecture that may be described as interconnected artificial neurons or "cells" interconnected in layers and/or blocks. In general, neural network model architecture can be described broadly by hyperparameters that describe the number of layers and/or blocks, how many cells each layer and/or block contains, what activations functions they implement, how they interconnect, etc. A neural network model includes trainable parameters (e.g., "weights") that indicate how much weight (e.g., in the form of an arithmetic multiplier) a cell should give to a particular input when generating an output. In some implementations, a neural network model may include other features such as a self-attention mechanism, which may determine certain parameters at run time based on inputs rather than, for example, during training based on a loss calculation. The various data that describe a particular TTS model 1360 may be stored in the voice profile storage 1385. A TTS model 1360 may represent a particular speaker identity and may be conditioned based on speaking style, emotion, etc. In some implementations, a particular speaker identity may be associated with more than one TTS model 1360; for example, with a different model representing a different speaking style, language, emotion, etc. in some implementations, a particular TTS model 1360 may be associated with more than one speaker identity; that is, be able to produce synthesized speech that reproduces voice characteristics of more than one character. Thus a first TTS model 1360a may be used to create synthesized speech for the first speech-processing system component 120a while a second, different, TTS model 1360b may be used to create synthesized speech for the second speech-processing system component 120b. In some cases, the TTS model 1360 may generate the desired voice characteristics based on conditioning data received or determined from the text data 1315 and/or the other input data 1325. For example a synthesized voice of the first speech-processing system component 120a may be different from a synthesized voice of the second speech-processing system component 120b.

The TTS component 680/780 may, based on an indication received with the text data 1315 and/or other input data 1325, retrieve a TTS model 1360 from the voice profile storage 1385 and use it to process input to generate synthesized speech. The TTS component 680/780 may provide the TTS model 1360 with any relevant conditioning labels to generate synthesized speech having the desired voice characteristics. The TTS model 1360 may generate spectrogram data 1345 (e.g., frequency content data) representing the synthesized speech, and send it to the vocoder 1390 for conversion into an audio signal.

The TTS component 680/780 may generate other output data 1355. The other output data 1355 may include, for example, indications or instructions for handling and/or outputting the synthesized speech. For example, the text data 1315 and/or other input data 1325 may be received along with metadata, such as SSML tags, indicating that a selected portion of the text data 1315 should be louder or quieter. Thus, the other output data 1355 may include a volume tag that instructs the vocoder 1390 to increase or decrease an amplitude of the output speech audio data 1395 at times corresponding to the selected portion of the text data 1315. Additionally or alternatively, a volume tag may instruct a playback device to raise or lower a volume of the synthesized speech from the device's current volume level, or lower a volume of other media being output by the device (e.g., to deliver an urgent message).

The vocoder 1390 may convert the spectrogram data 1345 generated by the TTS model 1360 into an audio signal (e.g., an analog or digital time-domain waveform) suitable for amplification and output as audio. The vocoder 1390 may be, for example, a universal neural vocoder based on Parallel WaveNet or related model. The vocoder 1390 may take as input audio data in the form of, for example, a Mel-spectrogram with 80 coefficients and frequencies ranging from 50 Hz to 12 kHz. The synthesized speech audio data 1395 may be a time-domain audio format (e.g., pulse-code modulation (PCM), waveform audio format (WAV), µ-law, etc.) that may be readily converted to an analog signal for amplification and output by a loudspeaker. The synthesized speech audio data 1395 may consist of, for example, 8-, 16-, or 24-bit audio having a sample rate of 16 kHz, 24 kHz, 44.1 kHz, etc. In some implementations, other bit and/or sample rates may be used.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 14:
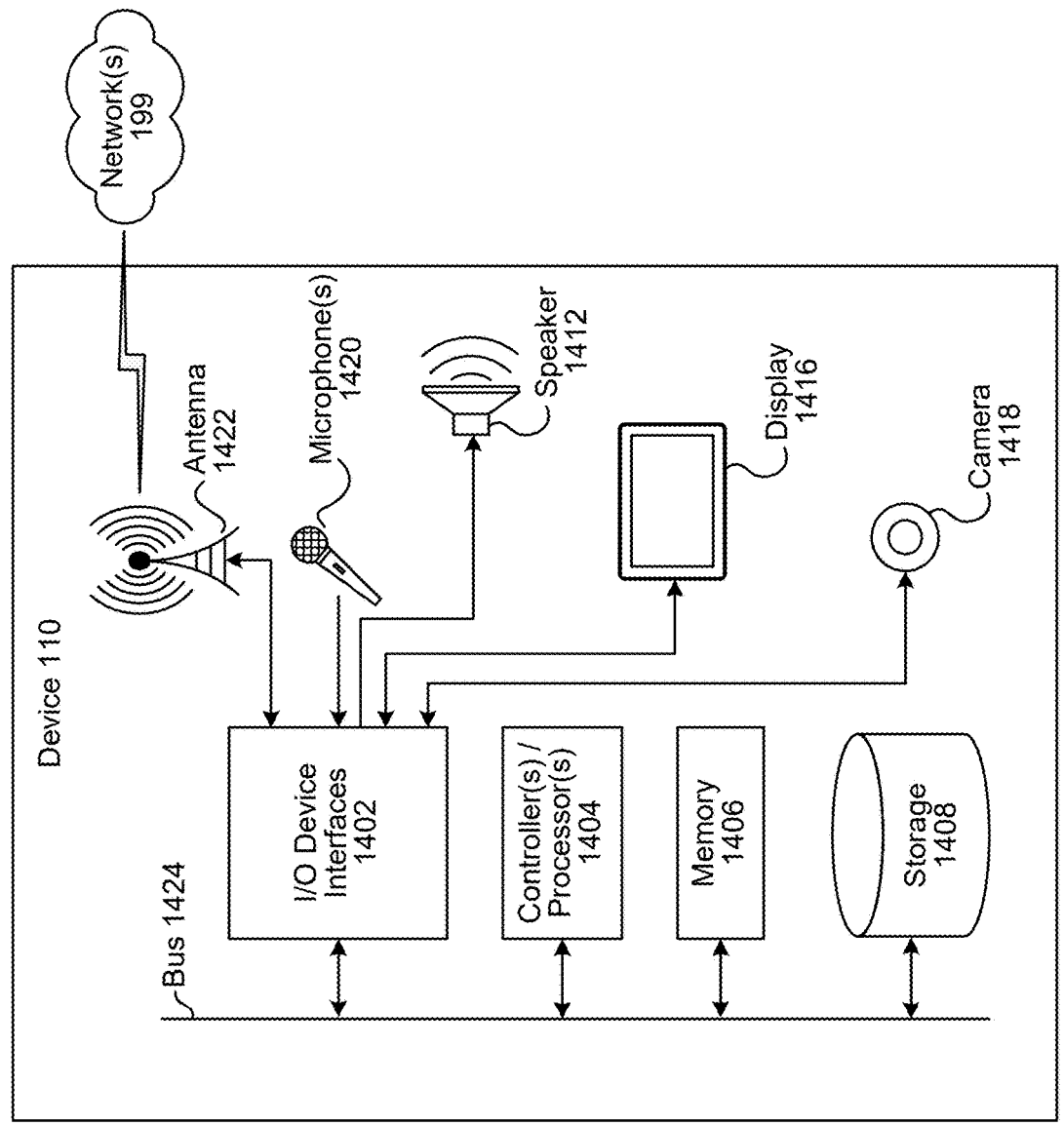
FIG. 14 is a block diagram conceptually illustrating example components of a device, according to embodiments of the present disclosure.
Figure 15:
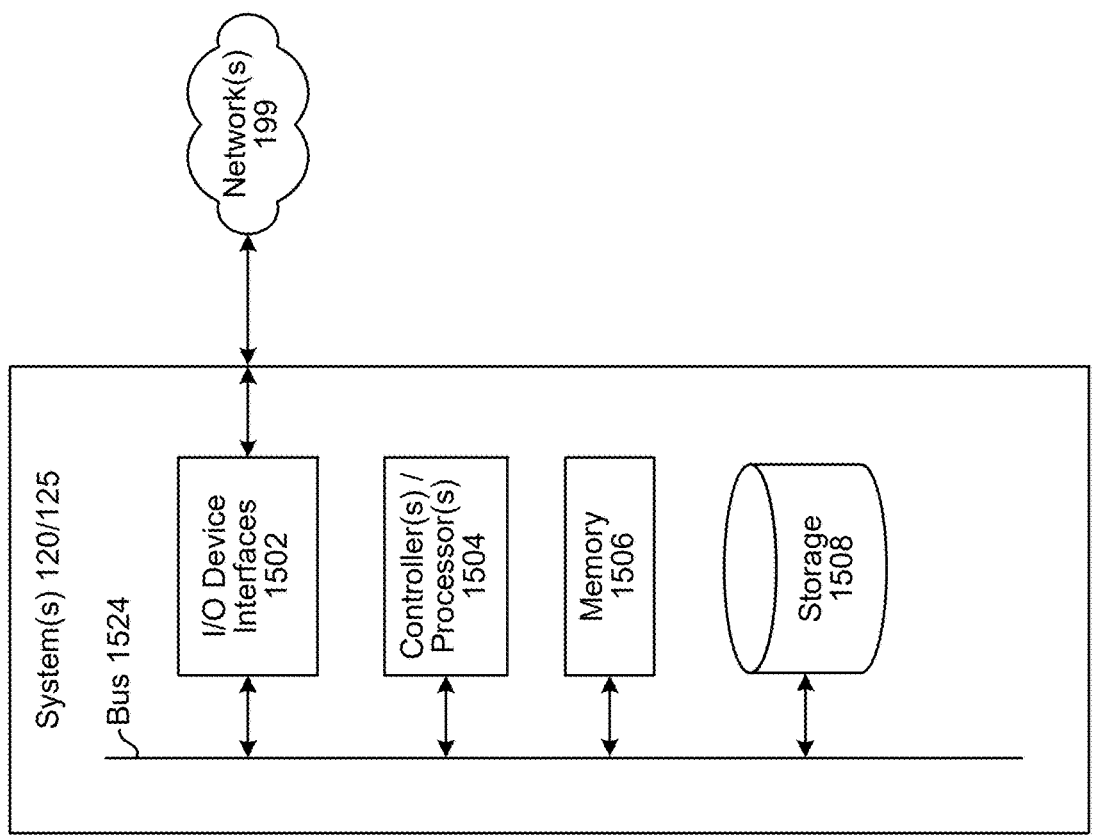
FIG. 15 is a block diagram conceptually illustrating example components of a system, according to embodiments of the present disclosure.

FIG. 14 is a block diagram conceptually illustrating a device 110 that may be used with the system. FIG. 15 is a block diagram conceptually illustrating example components of a remote device, such as the natural language command processing system component(s) 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) 120 may be located remotely from the device 110 as its operations may not require proximity to the user. The server/system component(s) 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system components 120 for performing ASR processing, one or more natural language processing system components 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1422, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the natural language command processing system component(s) 120, or a skill system 125 may include their own dedicated processors, memory, and/or storage. Alternatively, one or more of the components of the device(s) 110, the natural language command processing system component(s) 120, or a skill system 125 may utilize the I/O interfaces (1402/1502), processor(s) (1404/1504), memory (1406/1506), and/or storage (1408/1508) of the device(s) 110, natural language command processing system component(s) 120, or the skill system 125, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s) 120, and a skill system 125, as described herein, are illustrative, and may be located as a stand-alone device or may be included, in whole or in part, as a component of a larger device or system. As can be appreciated, a number of components may exist either on a system component(s) 120 and/or on device 110. For example, language processing 692/792 (which may include ASR 650/750), language output 693/793 (which may include NLG 679/779 and TTS 680/780), etc., for example as illustrated in FIGS. 6 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 16:
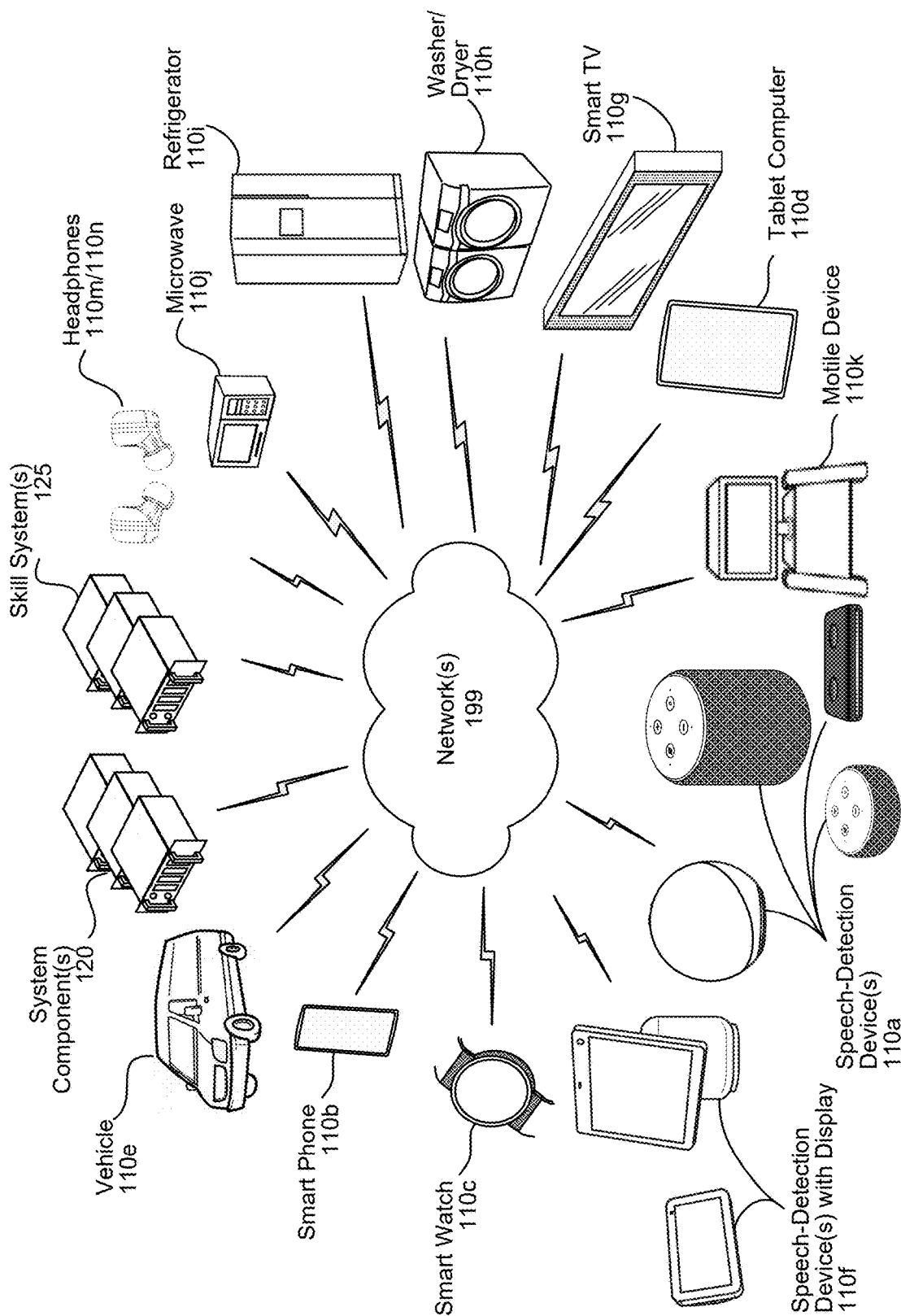
FIG. 16 illustrates an example of a computer network for use with the overall system, according to embodiments of the present disclosure.

As illustrated in FIG. 16, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   determining a first user is within a field of view of a camera of a hardware device associated with a group profile corresponding to a plurality of user identifiers;
   capturing, by the camera of the hardware device, image data of the first user;
   performing, by the hardware device, facial recognition processing using the image data and profile data associated with the group profile;
   determining, by the hardware device, based on the facial recognition processing, that the first user corresponds to a first user identifier of the plurality of user identifiers;
   receiving first input data corresponding to a first touch input on a touch-sensitive screen of the hardware device;
   determining the first input data corresponds to a first user interface element displayed on the touch-sensitive screen;
   determining first data indicating that the hardware device received the first touch input corresponding to the first user interface element;
   storing first association data representing an association between the first touch input and the first user identifier;
   sending, via a computer network, from the hardware device to a virtual assistant system different from the hardware device, the first data, the first association data associating the first touch input and the first user identifier, the first user identifier, and a request to perform operations to determine a response to the first touch input based on the first user identifier;
   receiving, by the hardware device and from the virtual assistant system, output data representing a response to the first touch input, wherein the response was personalized to the first user based on the first user identifier; and
   presenting an output on the touch-sensitive screen based at least in part on the output data.

2. The computer-implemented method of claim 1, further comprising:
   determining a second user is within the field of view of the camera of the hardware device associated with the group profile corresponding to the plurality of user identifiers, wherein the first user and the second user are concurrently within the field of view of the camera;
   capturing, by the camera, image data of the second user; and
   determining, based on the image data of the first user and the image data of the second user, that the first user is closer to the hardware device than the second user,
   wherein storing first association data representing the association between the first touch input and the first user identifier is based on determining the first user is closer to the hardware device than the second user.

3. The computer-implemented method of claim 1, further comprising:
   receiving audio data corresponding to a voice input;
   performing voice recognition processing using the audio data and the profile data associated with the group profile;
   determining, based on the voice recognition processing, that the voice input corresponds to a second user identifier of the plurality of user identifiers;
   in response to receiving the audio data, presenting the first user interface element displayed on the touch-sensitive screen; and
   after receiving the first input data corresponding to the first touch input, determining a user profile corresponding to the first user identifier has access to an action associated with the first user interface element.

4. The computer-implemented method of claim 1, further comprising:
   after presenting the output on the touch-sensitive screen, determining the first user is not within the field of view of the camera of the hardware device;
   receiving second input data corresponding to a second touch input on the touch-sensitive screen of the hardware device;
   determining the second input data corresponds to a second user interface element displayed on the touch-sensitive screen;
   determining the second input data was received within a time window of receiving the first input data;
   determining second data indicating that the hardware device received the second touch input corresponding to the second user interface element;
   storing second association data representing an association between the second touch input and the first user identifier; and
   sending, to the virtual assistant system, the second data, the second association data, and the first user identifier.

5. A computer-implemented method comprising:
   receiving first image data representing a first user from a camera of a first hardware device, the first hardware device associated with a group profile corresponding to a plurality of user identifiers;
   using the first image data and reference data corresponding to the group profile, performing facial recognition processing by the first hardware device to determine first data;
   determining, by the first hardware device and using the first data, a first user identifier from the plurality of user identifiers;

determining, by the first hardware device, second data corresponding to a touch interaction with a touch screen of the first hardware device;

determining, by the first hardware device, third data associating the first user identifier and the touch interaction;

sending, via a computer network, from the first hardware device to a second device different from the first hardware device and associated with a virtual assistant system, the first user identifier, the second data, the third data associating the first user identifier and the touch interaction, and a request to perform operations to determine a response to the touch interaction based on the first user identifier; and receiving, by the first hardware device and from the virtual assistant system, output data representing a response to the touch interaction and determined based on the first user identifier.

6. The computer-implemented method of claim 5, further comprising:

receiving second image data from the camera of the first hardware device, the second image data representing a second user;

performing facial recognition processing by the first hardware device to determine fourth data; and determining, based on the first data and the fourth data, fifth data representing that the first user is a shorter distance from the first hardware device than the second user, wherein determining the first user identifier using the first data is based at least in part on the fifth data.

7. The computer-implemented method of claim 5, further comprising:

determining the touch interaction occurred within a time window after performing the facial recognition processing.

8. The computer-implemented method of claim 5, further comprising:

receiving, at the first hardware device, fourth data representing voice input;

processing the fourth data to determine fifth data representing a command based on the voice input;

performing, by the first hardware device, voice recognition based on the voice input to determine a second user identifier;

after receiving the touch interaction, determining the first user identifier matches the second user identifier; and sending, from the first hardware device to the second device, the first user identifier and the fifth data.

9. The computer-implemented method of claim 5, further comprising:

determining the first image data represents the first user and a second user;

determining fourth data indicating the first user is interacting with the first hardware device; and performing, by the first hardware device, facial recognition processing of the first user, based on the fourth data, to determine the first data.

10. The computer-implemented method of claim 5, further comprising:

after the touch interaction, determining the first user is not within a field of view of the camera of the first hardware device;

determining fourth data corresponding to a second touch interaction with the first hardware device and occurring within a time window after performing the facial recognition processing; and sending, from the first hardware device to the second device, the fourth data and the first user identifier.

11. The computer-implemented method of claim 5, wherein the output data represents a rejection based on determining, using the first user identifier, that the first user does not have access to an application corresponding to the touch interaction.

12. The computer-implemented method of claim 5, further comprising:

determining a plurality of devices within a proximity of the first hardware device;

receiving fourth data representing at least one user identifier from the plurality of devices;

determining the plurality of user identifiers further based in part on the fourth data; and determining, from the plurality of devices, a third device associated with the user identifier is within the proximity of the first hardware device during a time window corresponding to the touch interaction.

13. A system, comprising:

at least one processor; and at least one memory comprising instructions that, when executed by the at least one processor, cause the system to:

receive first image data representing a first user from a camera of a first hardware device, the first hardware device associated with a group profile corresponding to a plurality of user identifiers;

perform facial recognition processing by the first hardware device to determine first data;

determine, by the first hardware device and using the first data, a first user identifier from a plurality of user identifiers;

determine, by the first hardware device, second data corresponding to a touch interaction with a touch screen of the first hardware device;

determine, by the first hardware device, third data associating the first user identifier and the touch interaction;

send, via a network, from the first hardware device to a second device different from the first hardware device and associated with a virtual assistant system, the first user identifier, the second data, the third data associating the first user identifier and the touch interaction, and a request to perform operations to determine a response to the touch interaction based on the first user identifier; and receive, by the first hardware device and from the virtual assistant system, output data representing a response to the touch interaction and determined based on the first user identifier.

14. The system of claim 13, wherein the at least one memory further includes instructions that, when executed by the at least one processor, further cause the system to:

receive second image data from the camera of the first hardware device, the second image data representing a second user;

perform facial recognition processing by the first hardware device to determine fourth data; and determine, based on the first data and the fourth data, fifth data representing that the first user is a shorter distance from the first hardware device than the second user, wherein determining the first user identifier using the first data is based at least in part on the fifth data.

15. The system of claim 14, wherein the at least one memory further includes instructions that, when executed by the at least one processor, further cause the system to:

determine the touch interaction occurred within a time window after performing the facial recognition processing.

16. The system of claim 13, wherein the at least one memory further includes instructions that, when executed by the at least one processor, further cause the system to:
receive, at the first hardware device, fourth data representing voice input;
process the fourth data to determine fifth data representing a command based on the voice input;
perform, by the first hardware device, voice recognition based on the voice input to determine a second user identifier;
after receiving the touch interaction, determine the first user identifier matches the second user identifier; and
send, from the first hardware device to the second device, the first user identifier and the fifth data.

17. The system of claim 13, wherein the at least one memory further includes instructions that, when executed by the at least one processor, further cause the system to:
determine the first image data represents the first user and a second user;
determine fourth data indicating the first user is interacting with the first hardware device; and
perform, by the first hardware device, facial recognition processing of the first user, based on the fourth data, to determine the first data.

18. The system of claim 13, wherein the at least one memory further includes instructions that, when executed by the at least one processor, further cause the system to:
after the touch interaction, determine the first user is not within a field of view of the camera of the first hardware device;
determine fourth data corresponding to a second touch interaction with the first hardware device and occurring within a time window after performing the facial recognition processing; and
send, from the first hardware device to the second device, the fourth data and the first user identifier.

19. The system of claim 13, wherein the output data represents a rejection based on determining, using the first user identifier, that the first user does not have access to an application corresponding to the touch interaction.

20. The system of claim 13, wherein the at least one memory further includes instructions that, when executed by the at least one processor, further cause the system to:
determine a plurality of devices within a proximity of the first hardware device;
receive fourth data representing at least one user identifier from the plurality of devices;
determine the plurality of user identifiers further based in part on the fourth data; and
determine, from the plurality of devices, a third device associated with the user identifier is within the proximity of the first hardware device during a time window corresponding to the touch interaction.

* * * * *